United States Patent
Hayland et al.

(10) Patent No.: US 8,595,823 B2
(45) Date of Patent: *Nov. 26, 2013

(54) SECURELY EXECUTING AN APPLICATION ON A COMPUTER SYSTEM

(71) Applicant: Software Secure, Inc., Newton Upper Falls, MA (US)

(72) Inventors: Raymond Hayland, Framingham, MA (US); Douglas Winneg, Boston, MA (US)

(73) Assignee: Software Secure, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,786

(22) Filed: Oct. 30, 2012

(65) Prior Publication Data

US 2013/0198833 A1    Aug. 1, 2013

Related U.S. Application Data

(63) Continuation of application No. 11/650,871, filed on Jan. 8, 2007, now Pat. No. 8,321,928, which is a continuation of application No. 11/354,216, filed on Feb. 14, 2006, now Pat. No. 7,165,269, which is a continuation of application No. 09/826,310, filed on Apr. 3, 2001, now Pat. No. 7,069,586.

(60) Provisional application No. 60/194,454, filed on Apr. 3, 2000.

(51) Int. Cl.
    *G06F 12/14*       (2006.01)

(52) U.S. Cl.
    USPC .................. 726/16; 726/2; 709/229; 713/172

(58) Field of Classification Search
    USPC .......................... 726/2, 16; 709/229; 713/172
    See application file for complete search history.

(56) References Cited

U.S. PATENT DOCUMENTS

| | | |
|---|---|---|
| 5,293,422 A | 3/1994 | Loiacono |
| 6,266,773 B1 | 7/2001 | Kisor et al. |
| 6,304,969 B1 | 10/2001 | Wasserman et al. |
| 6,327,579 B1 | 12/2001 | Crawford |
| 7,069,586 B1 | 6/2006 | Winneg et al. |
| 7,165,269 B2 | 1/2007 | Winneg et al. |
| 8,321,928 B2 | 11/2012 | Winneg et al. |

(Continued)

FOREIGN PATENT DOCUMENTS

WO    WO-9936848 A1    7/1999

*Primary Examiner* — Thanhnga B Truong
(74) *Attorney, Agent, or Firm* — Goodwin Procter LLP

(57) ABSTRACT

A method of and system for securely executing an application on a computer system such that a user of the computer system cannot access or view unauthorized content available on the computer system or accessible using the computer system. To securely execute an such method and system may terminate any unauthorized processes executing (i.e., running) on the computer system application prior to execution of the application, and may configure the application such that unauthorized content cannot be accessed, including configuring the application such that unauthorized processes cannot be initiated (i.e., launched) by the application. Further, such system and method may terminate any unauthorized processes detected during execution of the application, and may disable any functions of the computer system that are capable of accessing unauthorized content, including disabling any functions capable of initiating processes on the computer system. The application being securely executed may be any of a variety of types of applications, for example, a browser application or an application for receiving answers to questions of an examination (i.e., an exam-taking application). Securely executing an application may be used for any of a variety of purposes, including, among other purposes, to assist preventing students from cheating on exams, to assist preventing students from not paying attention in class, to assist preventing employees from wasting time at work, and to assist preventing children from viewing content that their parents deem inappropriate.

2 Claims, 12 Drawing Sheets

SECURELY EXECUTING AN APPLICATION ON A COMPUTER SYSTEM

RELATED APPLICATION

This application is a continuation application and claims priority to co-pending U.S. patent application Ser. No. 11/650,871 entitled "Securely Executing an Application on a Computer System" filed on Jan. 8, 2007, which is a continuation of U.S. Pat. No. 7,165,269 entitled "Securely Executing an Application on a Computer System" filed on Feb. 14, 2006, which is a continuation of U.S. Pat. No. 7,069,586, entitled "Securely Executing an Application on a Computer System" filed on Apr. 3, 2001, which claims priority to U.S. provisional application No. 60/194,454, filed on Apr. 3, 2000.

FIELD OF THE INVENTION

This application is directed to the field of computer-based testing systems, in particular, to securely executing an exam-taking application on a computer system such that a user of the computer system cannot access unauthorized content during execution of the exam-taking application.

BACKGROUND

Computers are having a growing impact in many areas of society. The lowering costs, increasing performance capability and increasing access to networks, for example, the Internet, is allowing computers to be used more easily and effectively. Further, many of today's computers enable applications and capabilities to be added to (i.e., loaded onto) computers by end users.

Although access to networks and the ability to add applications and capabilities to a computer has many well-known benefits, such access and ability sometimes can be detrimental.

For example, many households include personal computers to which children have access. Although the Internet and other networks make available a wealth of content (i.e., information), many parents do not wish all of this content (e.g., adult content) to be available to their children. However, there is often nothing to prevent a child from accessing adult content on the Internet or another network.

Further, a growing problem in the workplace is that employees are wasting time exploring the Internet (i.e., "surfing the net"). A similar problem exists in classrooms that provide Internet access, where students refrain from taking notes or paying attention to a lecture so that they may explore the Internet. In addition, students frequently are found in the classroom—or workers in the workplace—playing games or playing videos or music that came pro-loaded on their computers or that they loaded on to their computers. Yet another situation in which it is not desirable for students to have access to at least some content on an accessible network and/or and on their own computers is when a computer is being used by the student to take an exam.

As used herein, an "examination" or "exam" is a process that includes a set of one or more questions being asked, either orally or in writing, and may include receiving, either orally or in writing, a response to one or more of the questions.

As used herein, "taking an examination" or "taking an exam" includes being posed a set of one or more questions either orally or in writing, as part of an exam, and may include providing a response, either orally or in writing, to one or more of the questions.

The role of computers in education is growing. An increasing number of students, to starting at increasingly younger ages, are exposed to computers and use them in preparing school work. This preparation may include, among other activities, on-line research over the Internet, preparation of projects, preparation of written reports and use of learning exercises.

In many colleges (or universities), for entering freshmen and other classes of students, having access to a computer, particularly a laptop, is either a requirement or practically a necessity. To satisfy this growing need, colleges often have programs by which students can purchase or lease laptop computers at favorable rates. Many college campuses are updating their networking infrastructures to provide students with continuous and uninterrupted access to the college's local network and to the Internet.

Many professors are integrating their students' use of computers with the professors' classroom materials. For example, materials presented by a professor as part of teaching a course may be available on-line, for example, on the college's local network, and students typically can communicate with the professor via e-mail. This integration is occurring across a variety of disciplines, but is not confined merely to the science and engineering disciplines.

Computers and the software tools that run on them are affecting the way students prepare their work. A student typically takes advantage of the word-processing capabilities provided by computers and software tools to prepare written class work (i.e. a writing), for example, a paper, an essay, a thesis, written answers to part of a homework assignment, or a written part of a class project. The flexibility provided by many of today's word processing programs enables a student to fine-tune a writing by adding, rearranging and refining the writing's content (e.g., deleting, copying, cutting and pasting) until the writing is completed. A student may use this flexibility to prepare a writing by initially compiling a rough draft, knowing that rearrangement and refinement can readily be accomplished using the word processing program. Thus, typically, a writing submitted to the professor (or often an assistant of the professor) is not merely the student's first (and only) draft, but a product of the student reviewing and revising the first draft to produce the completed writing.

Notwithstanding the fact that computers appear firmly entrenched in a student's preparation of course work, there remains at least one area of school education where computers are not welcome. Even with their pervasive use, computers typically are barred from the examination (exam) room. A student may take notes in class on his laptop computer, communicate with the professor via e-mail, prepare writings using the computer, submit these writings via e-mail, and even receive a grade on the writing via-email from the professor, however, for exams (e.g., a midterm or a final exam), students often are confronted with a sign that reads something like: PLEASE CHECK YOUR LAPTOP COMPUTER AT THE DOOR. Thus, students typically are not allowed to use their laptops or any other computer to take an exam.

As a result, a student that may be conditioned and comfortable with expressing her thoughts in a rough draft using a computer, knowing that she can rearrange and refine the rough draft later, no longer has this ability at exam time. Under pressure and in handwriting, the student must prepare a coherent, well-organized and legible response to an exam question, frequently in an infamous "blue book."

The grader (professor or assistant) of the exams also suffers from the banning of laptops from the exam room. From the grader's perspective, after being able to read writings submitted electronically (e.g., via e-mail) throughout the semester, where each writing reflects a respective student's capabilities in the subject matter of the course, the grader must now plow through a stack of handwritten exam answers, many of which may be barely legible or completely illegible. As many graders acknowledge, the penmanship of students is deteriorating, most likely due to the more frequent use of a keyboard as opposed to handwriting to prepare writings, including communicating with other people (e.g., email), taking notes in class and preparing writings for classes. This poor penmanship compounds the difficulty of grading handwritten answers to exam questions.

Restricting laptop computers from exam rooms stems from the fear that during the exam students will have access to unauthorized content on the computer (or by using the computer to access unauthorized content on a network), and that this content will assist the student in taking the exam. In other words, there is a fear that students will cheat during the exam by accessing unauthorized content to assist them in providing answers to the exam questions. Content is unauthorized if the individual giving the exam (e.g., a professor) does not authorize the content for use by the student during the exam. In many circumstances, the risk and ease of cheating is so great that school administrators do not allow student laptops or other computers into the exam room for fear that cheating will become rampant.

Today, it appears that the use of computers in the classroom will continue to grow. Thus, restricting computers from the exam room should be addressed. Not being able to use a computer in the exam room may be deemed unfair or undesirable by both the students and the graders. For the reasons described above, by restricting a student from using a computer to take an exam, thereby forcing a student to handwrite answers, a student's knowledge and understanding of the material taught during the semester may not be determined accurately.

Accordingly, to allow students to use their computers during an exam and to prevent cheating by students, there is needed a technique for securing a variety of types of computers, for example, a laptop, or a personal computer or a workstation found in a computer lab so that unauthorized content may not be accessed during the exam.

More specifically, needed is a technique for securely executing an application, such as an application for receiving answers from a user to exam questions, on computers such that unauthorized content cannot be accessed during execution of the exam, so that a student's computer may be transformed into a secure exam-taking environment. Being able to transform any of a variety of types of computers into a secure exam-taking environment may be desirable to eliminate the need for dedicated exam-taking computers.

SUMMARY

Provided herein is a method of and system for securely executing an application on a computer system such that a user of the computer system cannot access or view unauthorized content available on the computer system or accessible using the computer system.

To securely execute an application, prior to execution of the application, such method and system may terminate any unauthorized processes executing (i.e., running) on the computer system, and may configure the application such that unauthorized content cannot be accessed, including configuring the application such that unauthorized processes cannot be initiated (i.e., launched) by the application. Further, such system and method may terminate any unauthorized processes detected during execution of the application, and, prior to execution of the first application, may disable any functions of the computer system that are capable of accessing unauthorized content, including disabling any functions capable of initiating processes on the computer system.

The application being securely executed may be any of a variety of types of applications, for example, a browser application or an application for receiving answers to questions of an examination (i.e., an exam-taking application).

Further, the method of and system for securely executing an application on a computer system described herein may be used on any of a variety of types of computer systems, for example, a laptop, or a personal computer or workstation of a computer lab, such that a user's computer system may be transformed into a secure application-executing environment, for example, a secure exam-taking environment. By transforming any of a variety of types of computers into a secure application-executing environment, one or more computers dedicated to a particular application may not be necessary.

Securely executing an application as described herein may be used for any of a variety of purposes, including, among other purposes, to assist preventing students from cheating on exams, to assist preventing students from not paying attention in class, to assist preventing employees from wasting time at work, and to assist preventing children from viewing content that their parents or guardians deem inappropriate.

In an illustrative embodiment, an application for receiving, from a user of a computer system, at least one response to at least one question of an examination is securely executed on the computer system. The computer system includes an input device and a display device for displaying content to the user. The application is executed on the computer system, which includes displaying an area on the display device in which the user can enter a response to at least one question of the examination, and enabling the user to use the input device to input a response for one or more of the questions into the displayed area. The computer system is prohibited from accessing any unauthorized content during execution of the application and from displaying any authorized content to the user during execution of the application.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another illustrative embodiment, provided is an apparatus for securely executing on a computer system an application for receiving, from a user of the computer system, at least one response to at least one question of an examination. The computer system includes an input device and a display device for displaying content to the user. The apparatus includes an application execution component to execute the application on the computer system, including display logic to display an area on the display device in which the user can enter a response to at least one question of the examination, and input logic to enable the user to use the input device to input a response for one or more of the questions into the displayed area. The apparatus also includes a security component to prohibit the computer system from accessing any unauthorized content during execution of the application and from displaying any authorized content to the user during execution of the application.

In another embodiment, an application is securely executed on a computer system. The application is executed on the computer system, and the computer system is prohibited from accessing any unauthorized content during execution of the application and from displaying any authorized content to a user of the computer system during execution of the application.

This embodiment may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In yet another embodiment, provided is an apparatus for securely executing an application on a computer system. The apparatus includes an application-executing component to execute the application on the computer system, and a security component to prohibit the computer system from accessing any unauthorized content during execution of the application and from displaying any authorized content to a user of the computer system during execution of the application.

The features and advantages of the embodiments described above and other features and advantages of these embodiments will be more readily understood and appreciated from the detailed description below, which should be read together with the accompanying drawing figures.

DESCRIPTION

An illustrative embodiment of a method of securely executing an application such that unauthorized content is prohibited from being either accessed or viewed by a user of the computer system during execution of the application is described below in the context of executing an exam-taking application. Such an illustrative embodiment is not meant to limit the scope of any of the claims set forth below and is provided merely for illustrative purposes, as such method may be used in a variety of other contexts, for example, in the context of executing a browser application.

As used herein, an "exam-taking application" is an application configured to enable a user to use a computer system to provide one or more answers to one or more questions of an exam.

Figure 1:
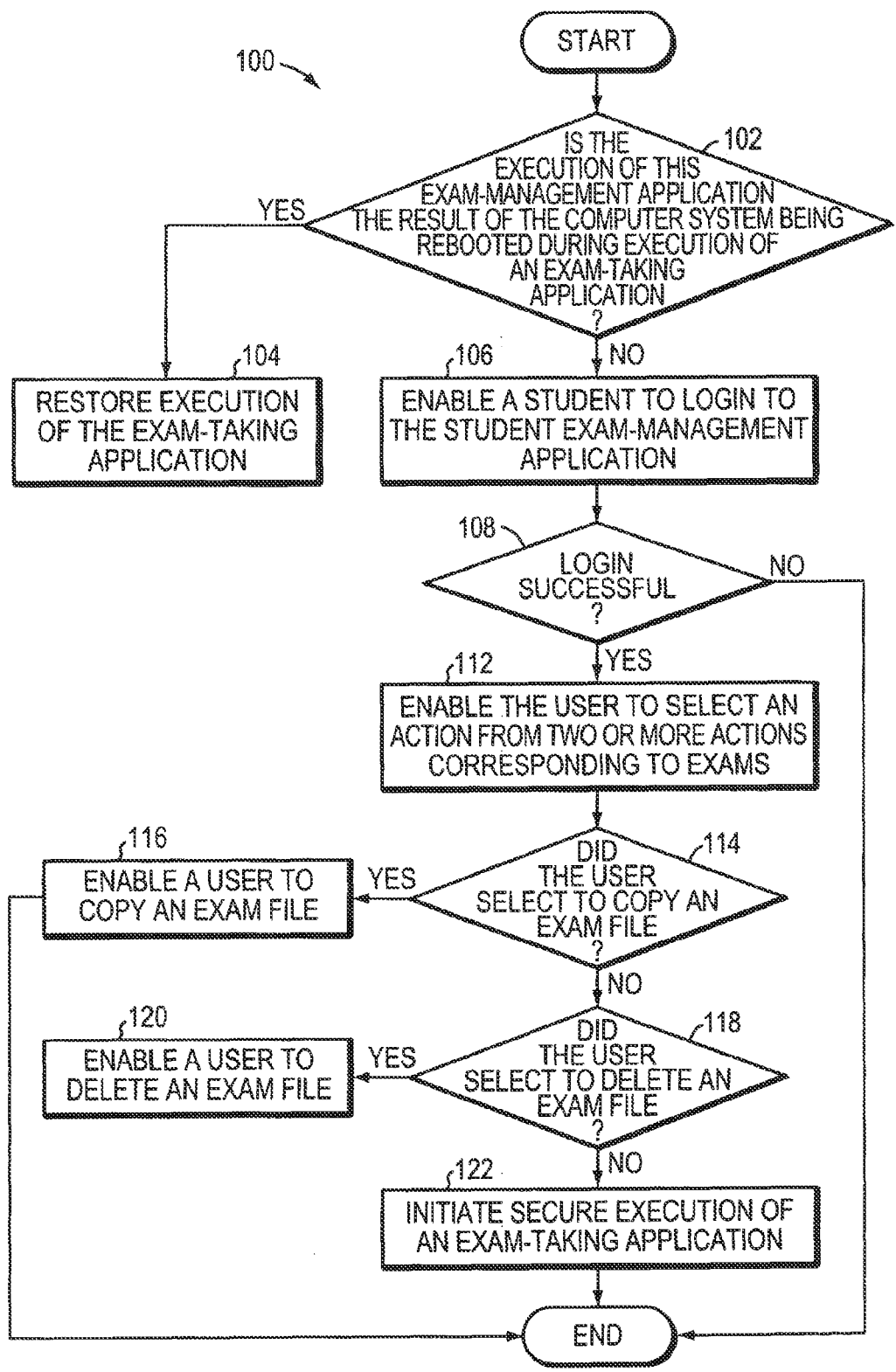
FIG. 1 is a flowchart illustrating an example of a method of executing a student exam-management application.

FIG. 1 is a flowchart illustrating an example of Method 100 for managing one or more exams for a student. Method 100 may be implemented using Secure Exam version 2.0 available from Software Secure, Inc. of Brookline, Mass.

In Act 102 it may be determined whether execution of this exam-management application is the result of the computer system being rebooted during an exam-taking application.

For example, as described below in relation to Act 159, the computer system may be configured such that, if the computer system is rebooted, execution of the exam-taking application is re-initiated. For example, in Act 159, a computer system parameter (i.e., flag) may be changed from its default value such that upon booting the computer system, the student exam-management application is automatically initiated. For one or more OSs, for is example, a Windows-type OS, an auto-run key may be set to a first logical value in the Windows registry. As used herein, a "Windows-type" operating system (OS) is one of the OSs of the family of Microsoft Windows OSs, including Microsoft Windows 95, Microsoft Windows 98, Microsoft Windows ME, Microsoft Windows 2000, Microsoft Windows NT, and any other version of Microsoft Windows released by Microsoft Corp.

Accordingly, as a result of the computer system being booted, such key may be accessed, to determine if the student exam-management application should be initiated.

Further, as described below in relation to Act 224, as a result of exiting the exam-taking application, the computer system parameter (e.g., auto-run key) may be cleared set back to its original default value so that the exam management application is not initiated upon reboot.

Thus, Act 102 may include ascertaining whether this auto-run key is set to a logical value indicating that execution of the exam-management application is the result of the computer system being rebooted during an exam-taking application.

If it is determined in Act 102 that the execution of this exam-taking application is not the result of the computer system being rebooted during execution of an exam-taking application then, in Act 106, a student may be enabled to login to the student exam-management application.

Another computer system parameter, for example, another entry of a windows registry may be set with the value that specifies a user ID of the last user who used the exam-management application. Accordingly, if the system is rebooted, the computer system may be configured such that only the ID stored in the computer system parameter may be used to log into the computer system.

Figure 2:
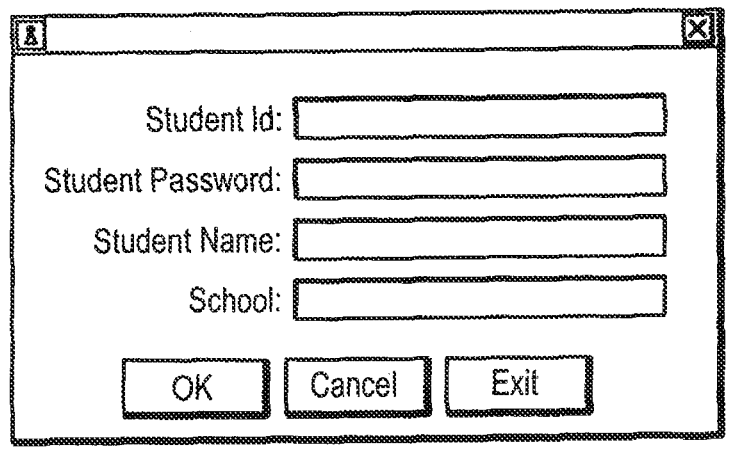
FIG. 2 is a screen shot of a graphical user interface for enabling a student to login to a student exam-management application.

FIG. 2 is a screen shot illustrating an example of a graphical user interface (GUI) by which a user may login to the student exam-management application. In the Student ID field, the student may enter the student's ID, and in the Student Password field, a student may enter the student's password corresponding to the student ID entered in the Student ID field. If the login is successful, after completion of the exam, the ID entered in the Student ID field may be recorded as the author of an exam file in which the completed exam is stored. By using the student's ID as the author of the exam file, the identity of the student may remain anonymous to a grader. Because a grader may have access to student ID, another unique identifier, for example, a code generated from the student ID may be recorded as the author of the exam file. Other identifiers may be used.

In the Student Name field, the student may enter the student's name. A student may enter the name of the student's school in the School Name field. The name entered in the School Name field may be stored along with the student name in the exam file for further identification purposes. For example, the school name may be stored as part of a header or footer of the exam file.

In Act 108, it may be determined whether the login is successful. The login is deemed successful if the student ID entered in the Student ID field is a valid student ID, and the student password entered in the Student Password field is a valid ID for the student ID entered in the Student ID field. To determine if the entered student ID is a valid student ID, the entered student ID may be compared against a list of valid student IDs, for example, a list stored in a text file on the computer system. If the entered student ID matches one of the student IDs in the list, the student ID may be deemed valid.

Figure 3:
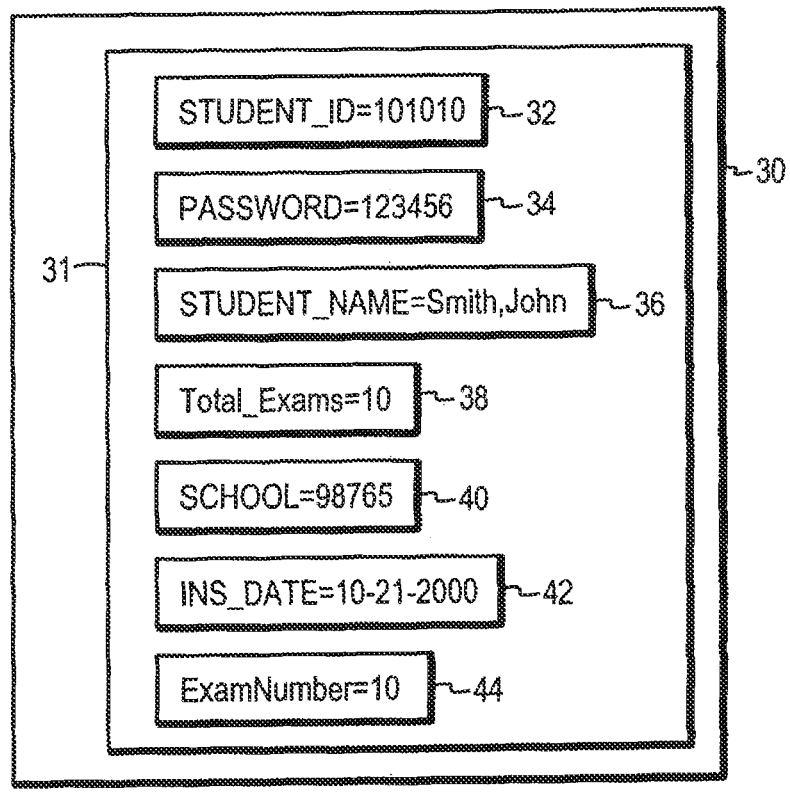
FIG. 3 is example of a student record included in a text file.

The list of valid student IDs may be part of text file that includes a plurality of records, each record corresponding to a student. For example, FIG. 3 is a block diagram illustrating an example of a text file 30 that includes at least a first record 31.

The record 31 may include a student ID field 32, a password field 34, a student name field 36, a total allotted exams field 38, a school ID field 40, an install date field 42 and a remaining number of exams field 44.

The student ID field 32 may store an ID corresponding to a student, and the student password field 34 may store a password corresponding to the student identified by field 32. The student name field 36 may store a name corresponding to the student identified in field 32, and total allotted exams field 38 may contain the total number of exams allotted to the student. For example, if a student is enrolled at a university, the total number of allotted exams stored in field 38 may specify a number of exams the student is permitted to take that semester using the student exam-management application.

The school ID field 40 identifies the school at which the exam is being taken. The install date 42 indicates the date that the student record was installed on the student's computer system (e.g., laptop). For example, the student record may have been created as part of installing the student exam-management application 100 on the student's computer system. The number of allotted exams 38 may be a default number configured during installation of the student exam-management application, and field 32-36 may contain information entered by the student.

Further, other information may be provided as part of a student record, for example, information pertaining to a user group to which the student belongs or other information pertaining to the exam.

Remaining exam number field 44 may contain the number of remaining exams allotted the student For example, in FIG. 3, the remaining exam number field indicates that all ten exams allotted to the user as specified by field 32 are still allotted. After execution of an exam-taking application, this number may be decremented as described below in relation to Act 172 of method 170.

The text file 30 also may include one or more other records for each user (i.e., student) who has used the computer system on which the text file is stored. Further, the text file may include a record for each student who connected to a web server or other network resource to register and/or purchase an allotment of one or more exams. The text file may be encrypted and/or stored on the computer system such that the user of the computer system cannot update and/or read the text file.

To determine if the entered student password is valid, the record 31 corresponding to the entered student ID may be accessed. The entered student password may be compared to the student password stored in field 34 of record 31. If the entered student password matches the student password of field 34, the entered student password may be deemed valid.

If, in Act 108, it is determined that the login was unsuccessful, then the method 100 may end. Further, a message may be displayed to the user indicating that the login was unsuccessful, including indicating whether the student ID or the student password was invalid.

If, in Act 108, it is determined that the login is successful because the entered student ID and the entered student password are both valid, then, in Act 112, the user may be enabled to select an action from two or more actions corresponding to exams. For example, Act 112 may include providing a GUI that displays a menu from which a user may select an action from two or more actions corresponding to exams.

Figure 4:
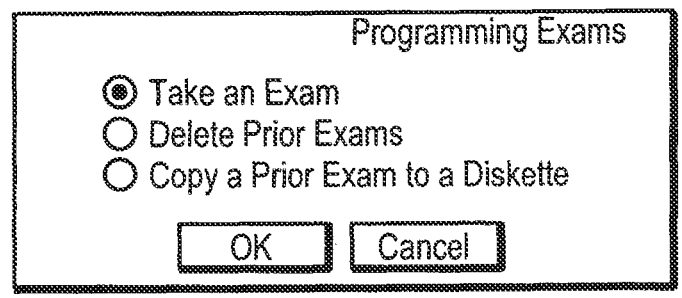
FIG. 4 is a screen shot illustrating an example of a graphical user interface for displaying a menu from which a user may select an action from two or more actions corresponding to exams.

For example, Act 112 may include providing the GUI illustrated in FIG. 4. This GUI provides a user with the option of taking an exam, deleting prior exams or copying a prior exam to a diskette.

In a next Act 114, it may be determined whether the user selected to copy an exam file, for example, by selecting the appropriate radio button from the GUI of FIG. 4.

If the user selected to copy an exam file in Act 114, then, in Act 116, the user may be enabled to copy an exam file.

Act 116 may include enabling a student to copy an exam from an exam directory to another location, for example, a floppy disk or another network address. This enables the student to make copies of an examination that can be attached to an email, stored as a backup or sent to a network directory corresponding to a course for which the exam was taken. As described below, upon completion of an exam, an exam file containing the student's responses to the exam questions may be stored in a predefined directory. Accordingly, Act 116 may include accessing such predefined directory and selecting an exam to copy to another location.

Figure 5:
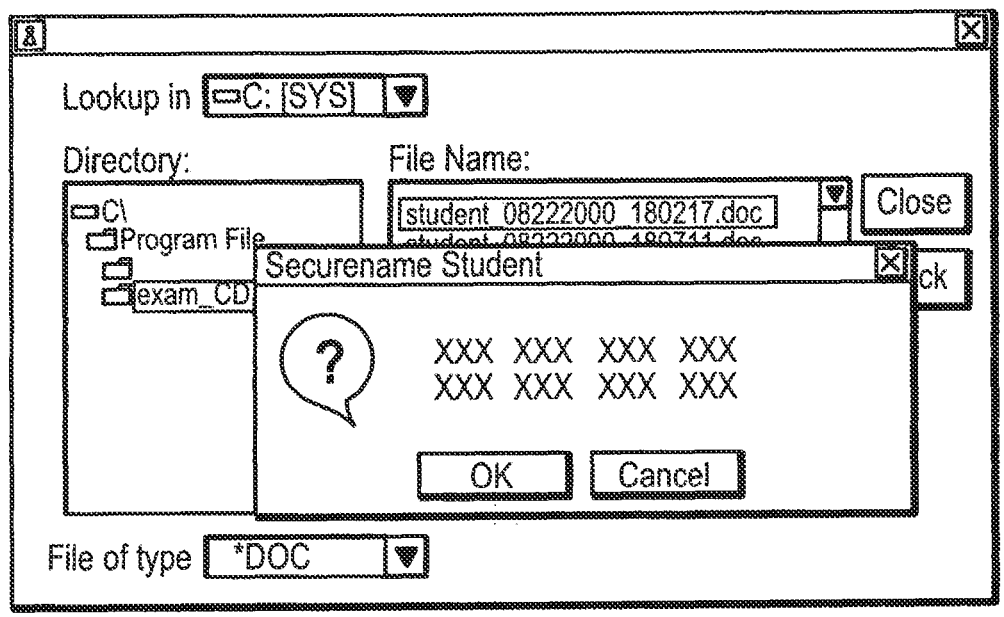
FIG. 5 is a screen shot illustrating an example of a graphical user interface for enabling a user to select and copy an exam file to a floppy disk.

Act 116 may include providing a GUI to enable a student to copy an exam file to another location, for example the GUI of FIG. 5. For a user to copy an exam file to the "A" drive of the computer system, the user may insert a disk into the A:drive and select the "copy" button of the GUI.

If, in Act 114, it is determined that the user did not select to copy an exam file, it may be determined whether the user selected to delete an exam file in Act 118. For example, it may be determined whether the user selected the radio button of the GUI of FIG. 4 that indicates to delete prior exams.

If it is determined in Act 118, that the user selected to delete an exam file, then in Act 120, the user may be enabled to delete an exam file.

Figures 6, 7:
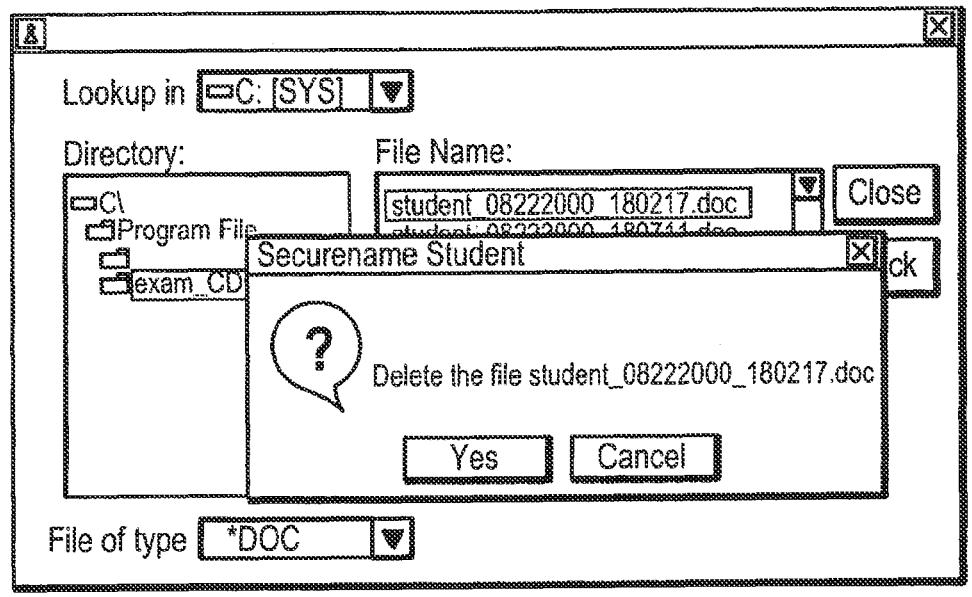
FIG. 6 is a screen shot illustrating an example of a graphical user interface for enabling a user to select and delete one or more exam files.
FIG. 7 is a screen shot illustrating an example of a graphical user interface enabling a user to enter information corresponding to an exam.

Act 120 may include providing a GUI, for example, the GUI of FIG. 6, to enable a user to select one or more exam files to be deleted. Act 120 may include accessing a pre-defined directory for completed exam files, and displaying a list of exam files that the user may delete. The user then may select one or more of the exam files to be deleted.

If in Act 118, it is determined that the user did not select delete an exam file, or if its determined that the user selected to take an exam, then, a GUI may be provided to the use to enable the user to enter information that specifies the exam to be taken.

For example, FIG. 7 illustrates a GUI that may be displayed to a user to determine which application to initiate for the exam. The GUI may include a Class Name field and a Professor field that prompt a user for input, whereas the Exam Date field may be determined from the exam-taking application itself and may be displayed in an Exam Date field. After the user has entered the class name and the professor in their respective fields and clicked on the OK button, the exam-taking application may use this information to determine a first application to be executed so that the student may take the exam (i.e., provide responses to one or more questions) and to determine the content (e.g., the questions of the exam or material to assist the user in taking the exam), if any, to be displayed by the first application.

For example, as described below in more detail, the first application may be a word-processing application such as Microsoft Word available from Microsoft Corp of Seattle, Wash. Such a word-processing application may provide a GUI that enables a user to provide one or more responses to one or more questions of an exam. The information entered to in the fields of FIG. 7 may be used to determine if content is to be displayed by the first application, as described below in more detail.

Further, some or all of the information entered using the GUI of FIG. 7 may be stored with the completed exam file, for example, as part of the header or footer of the exam file.

Further, after entering the information specified by the GUI of FIG. 7, a user may be prompted to enter a password corresponding to the selected exam. This password may have been set by the exam provider (e.g., a professor or a teaching assistant). If the student does not enter the correct password, the student may not be allowed to take the exam.

Else, after hitting the 'OK' button of the GUI, next, in Act 122, secure execution of the exam-taking application may be initiated.

Figure 8:
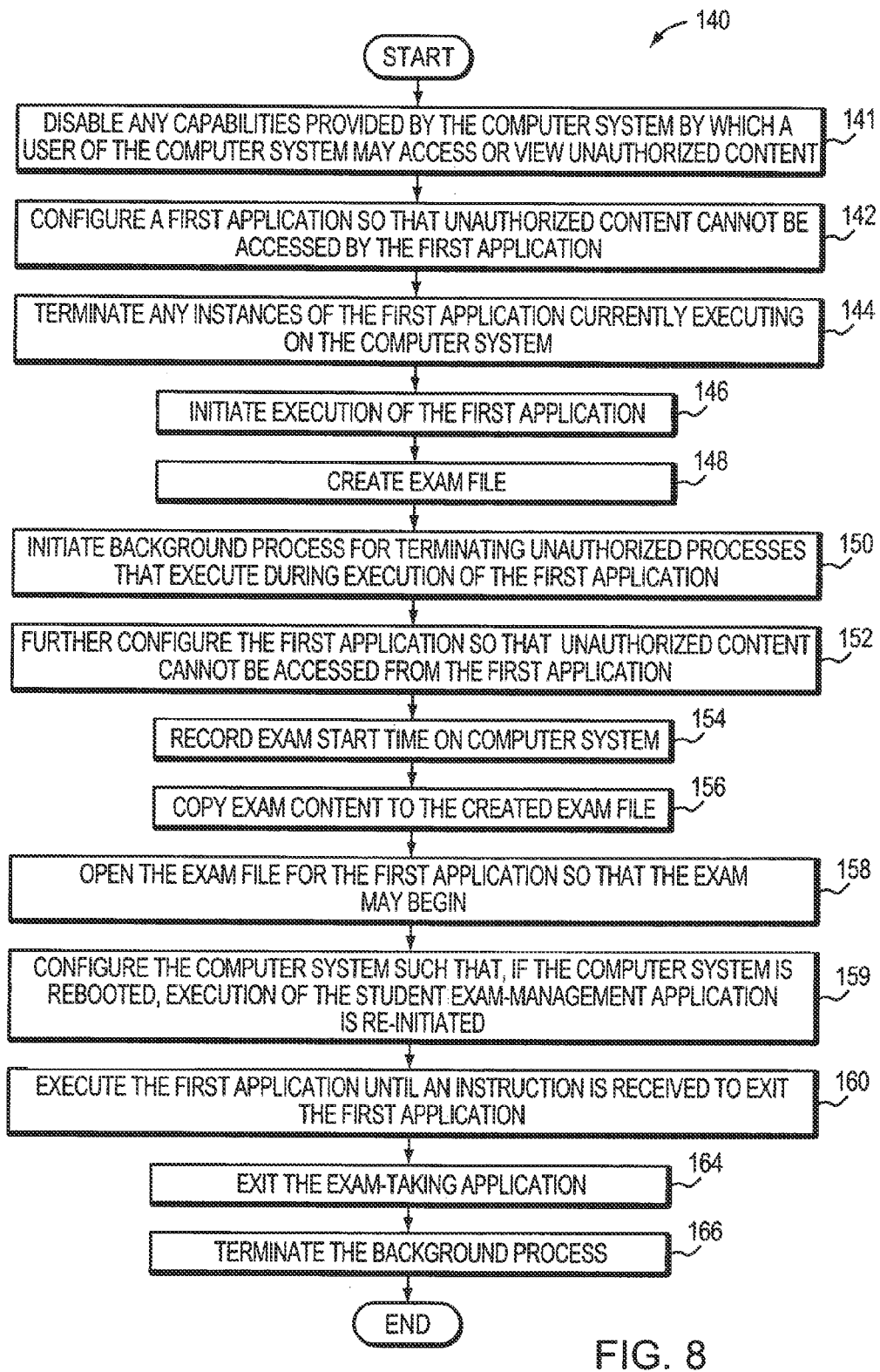
FIG. 8 is a flowchart illustrating an example of a method of securely executing an exam-taking application.

FIG. 8 is a flowchart illustrating an example of a method 130 securely executing an exam-taking application such that a user is prohibited from accessing or viewing unauthorized content during execution of the exam-taking application.

In Act 141, any capabilities provided by the computer system by which a user of the computer system may access or view unauthorized content may be disabled. Disabling such capabilities may be accomplished using any of a variety of techniques.

Figure 9:
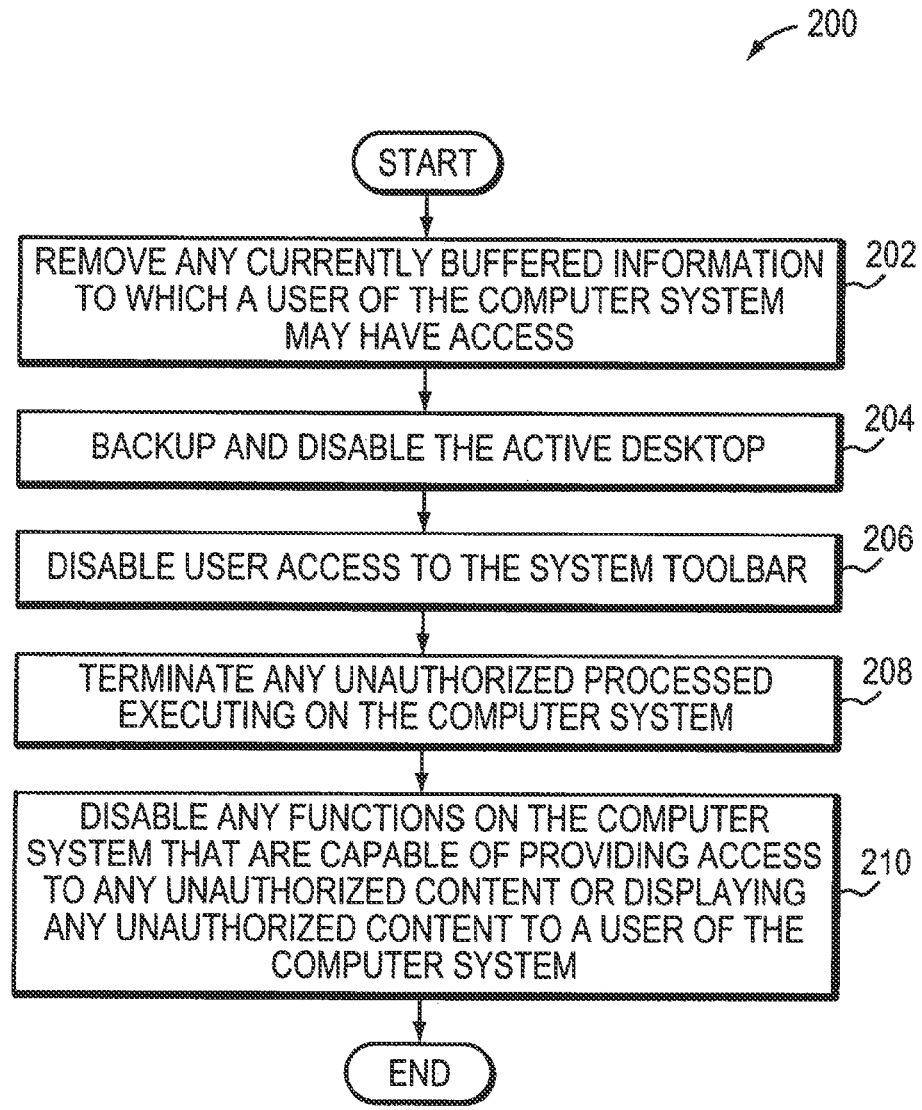
FIG. 9 is a flowchart illustrating an example of a method of disabling any capabilities provided by a computer system by which a user of the computer system may access or view unauthorized content.

FIG. 9 is a flowchart illustrating an example of a method 200 of disabling any capabilities provided by the computer system by which a user of the computer system may access or view unauthorized content.

In Act 202, any currently buffered information to which a user of the computer system may have access may be removed from the computer system. For example, if the OS of the computer system is a Windows-type OS, then any text stored in the clipboard may be cleared as part of Act 202. Removing any currently buffered information prevents a user of the computer system from buffering (e.g., cutting or copying) information into a buffer (e.g., clipboard) before executing the exam-taking application, and then retrieving the buffered information during execution of the exam-taking application.

In a following Act 204, the active desktop may be backed-up and disabled. A desktop essentially is a GUI that provides a user quicker access (e.g., shortcuts) to a variety of applications resident on the computer system. Thereby, by disabling the desktop, access to these applications is denied to a user. However, after execution of the exam-management application, the user's desktop should be restored to its previous configuration. Accordingly, a backup of the desktop is first recorded by taking a snapshot of the desktop before disabling it. After the exam-management application is completed, this snapshot may be restored to the computer system as described below in relation to Act 228 of method 220.

Further, for one or more types of OSs, for example, a Windows-type OS, a system toolbar may be provided as part of the GUI presented to a user of the computer system. The system toolbar is a set of one or more icons, where each icon provides a user access to a corresponding background process, for example, by allowing the user to click on the icon. Typical background processes include anti-virus software and network drivers.

Accordingly, to disable access to these background processes, in Acts 206, user access to the system toolbar may be disabled, for example, by removing the system toolbar from the GUI presented to the user.

In a next Act 208, any unauthorized processes executing on the computer system may be terminated. As used herein, a "process" is a named set of instructions executed on a computer system, for example, by a processor such as a microprocessor. Processes may include, inter alia, applications, programs, subsets of applications and programs, and processes initiated by an application or program. An application and/or a program similar to may include one or more other processes.

Unauthorized processes may be determined similar to as described below in relation to Acts 304-308. However, unlike the performance of Acts 304-308, which are performed as part of a continuous loop (which also includes Act 310), in Act 208, acts at least similar to Acts 304-308 (and also maybe Act 310) may be performed only once.

Appendix I is an example of a process, First_Daemon.c, written in the C++ programming language for terminating unauthorized processes. Other processes written in other programming languages or a combination of one or more programming languages, including C++, may be used to terminate unauthorized processes.

Further, a list of the unauthorized processes terminated by performance of Act 208 may be managed. Such a terminated process list may include a plurality of entries, where each entry stores an identifier (ID), for example, a name, of a terminated process. Accordingly, if an unauthorized process is terminated, it may be added to the list. The terminated process list may be managed using any of a variety of techniques, for example, by storing the list in a text file. Further, each time an unauthorized process is terminated, an ID for the unauthorized process may be added to the text file. Other techniques for maintaining the terminated process list may be used.

In a following Act 210, any functions of the computer system that are capable of either accessing unauthorized content or displaying unauthorized content to a user, including functions capable of initiating (i.e., launching) execution of a process on the computer system, may be disabled. The computer system may provide any of a variety of functions capable of initiating a process, for example, functions responsive to a user action, including, among several other actions, pressing of a particular key on a keyboard, pressing of a particular combination of keys concurrently on a keyboard, left-clicking a mouse, right-clicking a mouse, double-clicking a mouse, moving a scroll wheel on a mouse, inserting a CD into a CD drive, inserting a disk into a disk drive, touching a display screen, receiving data on a network connection, or receiving audio data on a microphone.

For example, Act 210 may include disabling the double-click event such that when a user double-clicks the mouse, nothing happens. For some OSs, for examples, a Windows-type OS, disabling the double-click function may prohibit a user from double-clicking on a menu object that would initiate a process and/or access unauthorized content on the computer system.

One or more of the functions disabled as part of Act 10 may prohibit disabled as part Act 10 may prohibit a user from initiating one or more processes that are not included on the unauthorized process list because they are utilized by the first application. Accordingly, disabling functions may prohibit a user from initiating one of these otherwise authorized processes.

Act 210 also may include disabling the "Ctrl-Alt-Delete" function. This is the function responsive to a user concurrently pressing the "Ctrl" key, the "Alt" key and the "Delete" key. As a result, if a user presses this combination of keys concurrently, nothing will happen. For some OSs, for example, Windows '95, '98 and ME, concurrently pressing this combination of keys enables a user to terminate an application currently executing on the computer system. By disabling the Ctrl-Alt-Delete function, a user will not be able to terminate any applications, for example, the first application, currently executing on the computer system.

Act 210 also may include disabling the "Alt-Tab" function. This is the function responsive to a user pressing the "Alt" and the "Tab" keys concurrently. As a result, if a user presses this combination of keys concurrently, nothing will happen. For some OSs, for example, a Windows-type OS, pressing this combination of keys concurrently allows a user to select an application currently executing on the computer system to which the user wants to return control. By disabling the Alt-Tab function, a user will not be able to access any other applications currently executing on the computer system, for example, unauthorized processes or authorized processes executing in the background.

Act 210 further may include disabling the right-click mouse function. The right-click function is responsive to a user clicking on the right button of a mouse. For some OSs, for example, a Windows-type OS, by disabling the right-click event, a user is prohibited from invoking a menu from which the user may initiate an unauthorized process and/or access unauthorized contact.

Act 210 further may include disabling one or more of the function keys available on a keyboard. For example, the F12 key may be disabled so that a user may not execute the "save as" function and store data at a location (e.g., on a hard drive of the computer system, on a floppy disk or at a network address of a network on which the computer system resides) chosen by the user. Such data may include exam questions that other student could use to cheat, and that the exam provider (e.g., professor) may regard as protected intellectual property, which the professor or a certification agency may aggressively attempt to protect.

Act 210 also may include disabling a CD auto-run function. The CD auto-run function is responsive to a user inserting a CD into a CD drive. For some OSs, for example, a Windows-type OS, disabling this event prevents a user from inserting a CD into a CD drive and automatically initiating any applications or processes that read data or initiate any applications stored on the CD.

Act 210 also may include disabling a floppy (A:) drive auto-run function. The floppy drive auto-run function is responsive to a user inserting a floppy disk into a floppy disk drive. For some OSs, for example, a Windows-type OS, disabling this event prevents a user from inserting a floppy disk into the floppy disk drive and automatically initiating any applications or processes that read data or initiate any applications stored on the floppy disk.

Further, the computer system may be configured to not allow the area (e.g., window) in which an application is displaying information to be resized, maximized, or minimized. Preventing the display from being resized, maximized, minimized, or changed in any other way prevents a user from hiding information behind the display area, and from navigating outside of the application window.

To assist in disabling one or more of the functions on the computer system that are capable of accessing unauthorized content and/or displaying unauthorized content to a user of the computer system, one or more programming hooks may be utilized. As used herein, a "programming hook" or "hook" is a function provided as part of a lower-level interface (e.g., an Application Programming interface (API)) to an OS of a computer system (or an application executing on the computer system) that may be programmed (i.e., configured or customized) after the computer system has been deployed to a consumer.

More specifically, for one or more types of OSs, for example, a Windows-type OS, a hook is a mechanism by which a function can intercept events (messages, mouse actions, keystrokes) before they reach an application. The function can act on events and, in some cases, modify or discard them. Functions that receive events are called "filter functions" and may be classified according to the type of event they intercept. For example, a filter function may be configured to receive all keyboard or mouse events. For a Windows-type OS to call a filter function, the filter function must be installed (i.e., attached) to a Windows hook (for example, to a keyboard hook). Attaching one or more filter functions to a hook is known as "setting a hook." If a hook has more than one filter function attached, Windows maintains a chain of filter functions. The most recently installed filter function is at the beginning of the chain, and the least recently installed function is at the end.

If a hook has one or more filter functions attached and an event occurs that triggers the hook, Windows calls the first filter function in the filter function chain. This action is known as "calling the hook." For example, if a filter function is attached to the CBT hook and an event that triggers the hook occurs, for example, a window is about to be created, Windows calls the CBT hook by calling the first function in the filter function chain. Programming hooks, more specifically programming hooks corresponding to a Windows-type OS, are described in more detail in relation to Appendix II.

To disable one or more functions on the computer system that are capable of providing access to any unauthorized content or displaying any unauthorized content to a user of the computer system, one or more hooks may be utilized. These hooks may be used to capture messages generated by the computer system, for example, in response to user actions. Such user actions may include pressing keys and combinations of keys on the keyboard or clicking or moving the mouse. These hooks may be configured, for example, by a programmer to prevent messages (i.e., instructions) from reaching their target applications, for example, the first application. Such prevention may be defined for a programming hook by defining a return value for the hook. This return value may be defined such that the message that it captures is not forwarded to the target application or such that some other action is performed before the instruction reaches the target application or performed in place of the instruction reaching the target application.

Accordingly, Act 210 may include providing a dynamic link library (DLL) that includes a plurality of hooks for intercepting events (e.g., messages, mouse action, key strokes) before they reach an application, for example, the first application described in more detail below. Further, one or more of the hooks of the DLL may be configured to prevent the event from reaching the first application, before performing an action before sending the event to the application.

Thus, Act 210 may include installing such a DLL on the computer system such that one or more of the hooks may be utilized during execution of the exam-taking application.

Appendix III is an example of a DLL, Hooksdll.C written in the C programming language that may be installed as part of Act 210 and whose hooks may be utilized during execution of the first application described below. Other processes written in other programming languages or a combination of one or more programming languages, including C, may be used as part of Act 210 to implement programming hooks that prevent unauthorized content from being accessed by or displayed by the first application.

The DLL for providing the hooks (hereinafter Hooksdll) may include a function to assign a value to a variable of the computer system, where this variable may be accessed by other functions to determine that HooksDll has been installed and initialized.

Hooksdll also may include a function "InstallFilter," to provide a unique entry to install and/or remove one or more of the hooks to/from the computer system.

Hooksdll also may include functions defining encryption and decryption algorithms for encrypting and decrypting, respectively, files during execution of the exam-taking application.

For example, Hooksdll may include the following encryption code:

```
#ifdef USE_BLOCK_CIPHER
    // defines for RC2 block cipher
    #define ENCRYPT_ALGORITHM    CALG_RC2
    #define ENCRYPT_BLOCK_SIZE   8
#else
    // defines for RC4 stream cipher
    #define ENCRYPT_ALGORITHM    CALG_RC4
    #define ENCRYPT_BLOCK_SIZE   1
#endif
```

Hooksdll also may include another function to be called to assist in encrypting or decrypting a function, which creates internal data for a user's Windows logon account. Hooksdll also may include a hook configured intercept WM_NCCREATE message from the OS before the messages reaches the exam-taking application. Intercepting this message prevents the exam-taking application from creating a default window, for example, by executing Winpopu.exe. Hooksdll also may include a CBT function to intercept the HCBT_CREATEWND message and other low-level messages sent from the OS to the exam-taking application. This hook may be used to prevent a spell checker of the first application from being utilized by a user of the first application. Further, this hook also may be utilized to prevent a user from minimizing a window of the first application.

As described below, the first application may be customized with functionality to display a timer. Such a timer may be used by a student during an examination to determine the elapsed time since the student began the exam. Further, the timer may be configured such that if the user leaves the exam, for example, by rebooting the computer system, the timer continues to count. Accordingly, the time during which the computer system is down is to included in the time elapsed since the student began the exam.

This timer functionality may be added to the first application by configuring a template for the application, as described below in more detail in relation to Act 142, and may be enabled by use of a hook.

Accordingly, Hooksdll also may include a function to intercept a message sent from the OS to the first application that responds to a user hitting the "Ctrl" and the "T" keys concurrently, and sending a message to the first application to display the timer.

Hooksdll also may include a function to intercept all messages sent from the OS to a destination window (e.g., a window of first application) in response to a user hitting a key or combination of keys of the keyboard. A return value for this hook may be set to a non-zero value to disable certain key combinations. For example, this hook may be used to disable function keys F1-F10, to disable ALT_SHIFT DLL, any of the hook keys listed below in Table 1, or any of a variety of other keys or key combinations.

Hooksdll also may include a hook to intercept any messages from the operating system to a destination window (e.g., a window of the first application) in response to a mouse event, for example, double clicking the left mouse button, right clicking the right mouse button, or moving the scroll wheel of the mouse. This hook may be configured to return a non-zero value such that the mouse message is not sent to the destination window. Further, the hook may be configured to determine the mouse position and based on the mouse position, disable one or more mouse events. For example, this hook may be used to disable one or more of the mouse events listed below in Table 2.

TABLE 1

| VK_SNAPSHOT |
| VK_F1; |
| VK_F2; |
| VK_F3; |
| VK_F4; |
| VK_F6; |
| VK_F8; |
| VK_F9; |
| VK_F10; |
| VK_F11; |
| VK_F12; |
| VK_ESCAPE; |
| VK_APPS;   //   Microsoft Menu Key |
| CTRL_C |

TABLE 2

| WM_RBUTTONDOWN | // Right button event |
| WM_RBUTTONUP; | |

TABLE 2-continued

```
WM_NCRBUTTONDOWN;
WM_NCRBUTTONUP;
WM_LBUTTONBLCLK;
WM_SYSCOMMAND;
```

The order of the acts performed as part of method 200 is not limited to the order illustrated in FIG. 9 as the acts may be performed in other orders. For example, Act 210 may be performed before Act 202. Further, one or more of the acts of method 200 may be performed in series or in parallel to one or more other acts. For example, at least parts of Acts 208 and 210 may be performed in parallel.

Method 200 is merely an illustrative embodiment of a method 200. Such an illustrative embodiment is not meant to limit the scope of any of the claims set forth below and is provided merely for illustrative purposes, as any of a variety of other methods of disabling any capabilities provided by a computer system by which a user of the computer system may access and view unauthorized content, for example, variations of method 200, may fall within the scope of one or more of the claims set forth below.

Returning to method 130 of FIG. 8, in Act 142, a first application may be configured so that unauthorized content cannot be accessed by the first application. This configuring may include configuring the first application such that unauthorized processes cannot be initiated by the application.

If the first application is Microsoft Word available from Microsoft Corp., Act 142 may include replacing the "normal.dot" template with a customized template that provides only a subset of the functions normally available in Microsoft Word. For example, the customized template may be configured so that a user cannot initiate any processes external to Microsoft Word.

The customized template may be configured by altering the menus typically provided by the normal.dot template. Menu options capable of initiating processes external to Microsoft Word may be removed. Further, the customized template may be configured such that one or more keys or key combinations (i.e., "hot keys" or "shortcuts") are disabled, but other keys and key combinations remain enabled.

For example, the customized template may be configured to enable one or more of the shortcut keys listed Table 3 below:

TABLE 3

| Shortcut | Function |
| --- | --- |
| Alt + Ctrl + 1 | ApplyHeading1 |
| Alt + Ctrl + 2 | ApplyHeading2 |
| Alt + Ctrl + 3 | ApplyHeading3 |
| Ctrl + B; Ctrl + Shift + B | Bold |
| Ctrl + Page Down | BrowseNext |
| Ctrl + Page up | BrowsePrev |
| Ctrl + E | CenterPara |
| Left | CharLeft |
| Shift + Left | CharLeftExtend |
| Right | CharRight |
| Shift + Left | CharRightExtend |
| Ctrl + Backspace | DeleteBackwrod |
| Ctrl + Delete | DeleteWord |
| Ctrl + C; Ctrl + Ins | EditCopy |
| Ctrl + X; Shift + Delete | EditCut |
| Ctrl + F | EditFind |
| Ctrl + G | EditGoto |
| Shift + Ins; Ctrl + V | EditPast |
| Ctrl + A | EditSelectAll |
| Ctrl + End | EndofDocument |
| End | EndOfLine |

TABLE 3-continued

| Shortcut | Function |
| --- | --- |
| Shift + End | EndOfLineExtend |
| Alt + Ctrl + Page Down | EndOfWindow |
| Ctrl + S | FileSave |
| Ctrl + I; Ctrl + Shift + I | Italic |
| Ctrl + L | LeftPara |
| Down | LineDown |
| Shift + Down | LineDownExtend |
| Up | LineUp |
| Shift + Up | LineUpExtend |
| Page Down | PageDown |
| Page Up | PageUp |
| Ctrl + Down | ParaDown |
| Ctrl + Up | ParaUp |
| Alt + Ctrl + Y | RepeatFind |
| Ctrl + R | RightPara |
| Ctrl + Home | StartOfDocument |
| Home | StartOfLine |
| Shift + Home | StartOfLineExtend |
| Ctrl + U; Ctrl + Shift + U | UnderLine |
| Ctrl + Left | WordLeft |
| Ctrl + Right | WordRight |
| Ctrl + Shift + W | WordUnderLine |

Each key representing a letter of the alphabet may remain enabled. Further, key combinations for performing typical word processing functions, for example, selecting, copying, cutting, pasting, and moving the cursor, may remain enabled.

Further, the first application may be configured such that hyperlink functionality is not available within the first application. Thus, a user cannot type in a uniform resource locator (URL) and automatically launch a browser application that hyperlinks the user outside of the first application.

Some of the functions disabled by configuring the application also may be disabled by disabling the function on the computer system. For example, one or more of the key combinations described above also may be disabled on the computer system using the keyboard Func programming hook. Further, one or more functions disabled on the computer system in Act 210 also may be disabled as part of configuring the application in Act 6.

The customized template may be configured with one or more macros, where one or more of the macros may be configured to be executed as part of Act 152 described below. For example, because the customized template may be the template Tempdoc.doc of Appendix IV, written in the visual basic programming language. The macro Minitialize( ) of Tempdoc.doc may be configured to be executed as part of Act 152. Minitialize( ) may be configured to perform a variety of functions, for example, Minitialize( ) may be configured to disable the cancel (i.e., ESC) button, remove the custom dictionary provided by Microsoft Word, remove Word toolbars, and add a customized toolbar for executing Microsoft Word as part of the exam-taking application.

Minitialize( ) may be configured to first disable the cancel button, because the cancel button, if pressed by a user, may interrupt the macro and prevent the macro from being completed. Therefore, disabling the cancel button first ensures that the other macros of the custom template cannot be interrupted.

Tempdoc.doc may include a macro FirstRun( ), configured such that it is executed at the start of the exam, as described below in more detail in relation to Act 154. FirstRun( ) may be configured to record the exam start time on the computer system, for example, by setting the start time in the Windows registry.

The normal.dot template may be replaced with the customized template using any of a variety of techniques. For example, if the OS is a Windows-type OS, then the Windows registry may be accessed to retrieve the path for Microsoft Word and locate the Template directory. The path of the Template directory may be different for different versions of Microsoft Word, for example, Word97 and Word2000. The normal.dot templates stored in the Template directory may be renamed to a name that will be later recognized when the normal.dot template has to be restored. The customized template then may be stored in the Template directory.

As a next step in replacing the normal.dot template with the customized template, the to renamed normal.dot template may be removed from the Template directory and stored in another directory to be accessed later to restore the original normal.dot template. Next, the customized template may be renamed normal.dot. Accordingly, after Microsoft Word is initiated, it will access the Template directory and extract the template named normal.dot, which is actually the customized template.

For example, the customized template may be accessed and installed as part of Act 154 described below, and one or more of the macros may be executed.

Returning to method 140, in a next Act 144, any instances of the first application currently executing on the computer system may be terminated. As described above, the first application should be included on a list of authorized processes, else the first application would be terminated by performance of Acts 302-308 described below. However, prior to performance of method 300, one or more instances of the first application already may be executing on the computer system, and may be accessing unauthorized content and/or executing unauthorized processes.

Accordingly, prior to performance of Act 146, any instances of the first application currently executing on the computer system may be terminated. To determine if an instance of the first application is currently executing on the computer system, a list of processes currently executing on the computer system may be accessed. The list may contain one or more entries, where each entry contains an identifier of a process currently executing on the computer system. Each entry may be accessed to determine whether the identifier of the entry is an identifier for the first application. If a match is found, the instance of the first application may be terminated and the identification of the instance may be removed from the list of currently executing processes.

For example, if the OS of the computer system is a Windows-type OS, and the first application is Microsoft Word, determining whether an instance of Microsoft Word is currently executing on the system may include accessing the Windows registry to see if an identifier for an instance of Microsoft Word is included in the registry.

As an alternative to separately determining whether an instance of the first application is currently executing on the computer system, prior to performance of Act 208, the authorized process list may not include the first application such that any instances of the first application executing on the computer system prior to performance of Act 208 are terminated as part of performing Act 208. Then, after the performance of Act 208, the first application may be added to the list of authorized processes such that the first application is not terminated by performance of Acts 302-308.

Returning to method 300, in a following Act 146, execution of the first application may be initiated.

Figure 11:
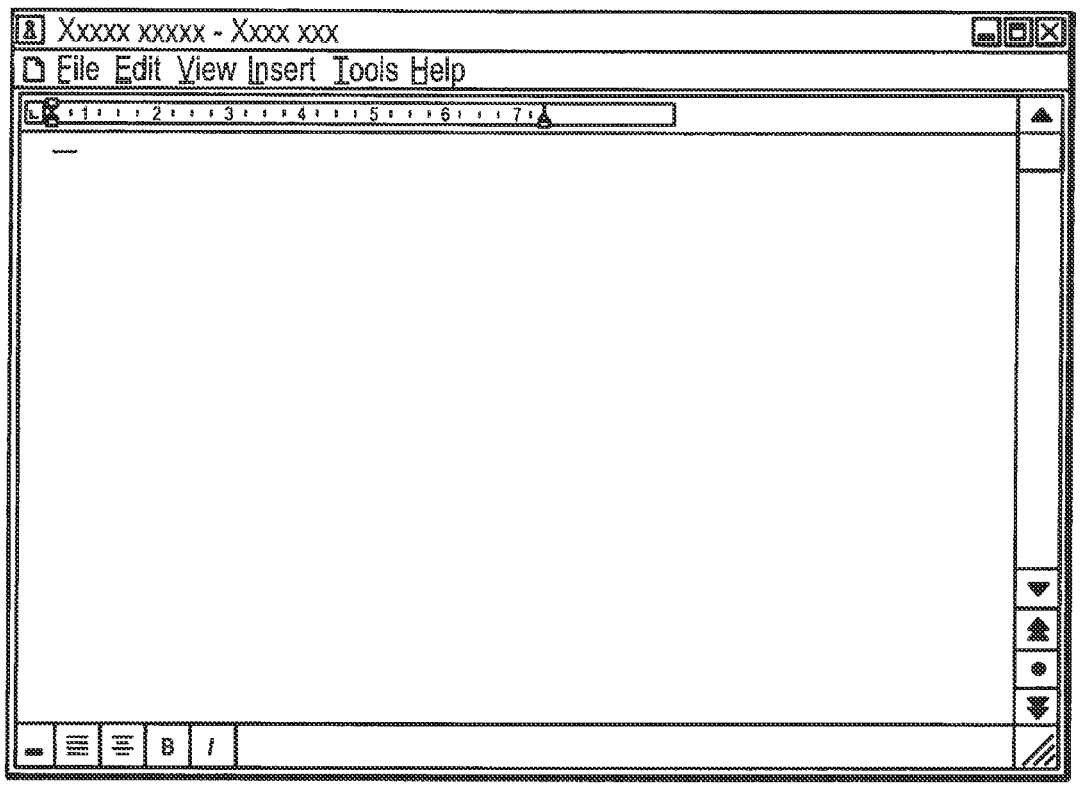
FIG. 11 is a screen shot illustrating an example of a graphical user interface of a word processing application enabling a user to input one or more responses to one or more questions of an exam.

Act 160 may include providing a GUI to a user of the computer system, for example, the GUI of FIG. 11. The GUI of FIG. 11 may be an instance of Microsoft Word customized with a custom template, for example, a customized template described above in relation to Act 142.

Any of a variety of GUIs may be provided as part of Act 160. For example, the GUI of FIG. 11 also may include one or more tool bars, for example, one or more tool bars provided by a customized template such as Tempdoc.doc of Appendix IV.

Next, in Act 148, an exam file may be created. For example, if the first application is Microsoft Word, a Microsoft Word file may be created.

Figure 10:
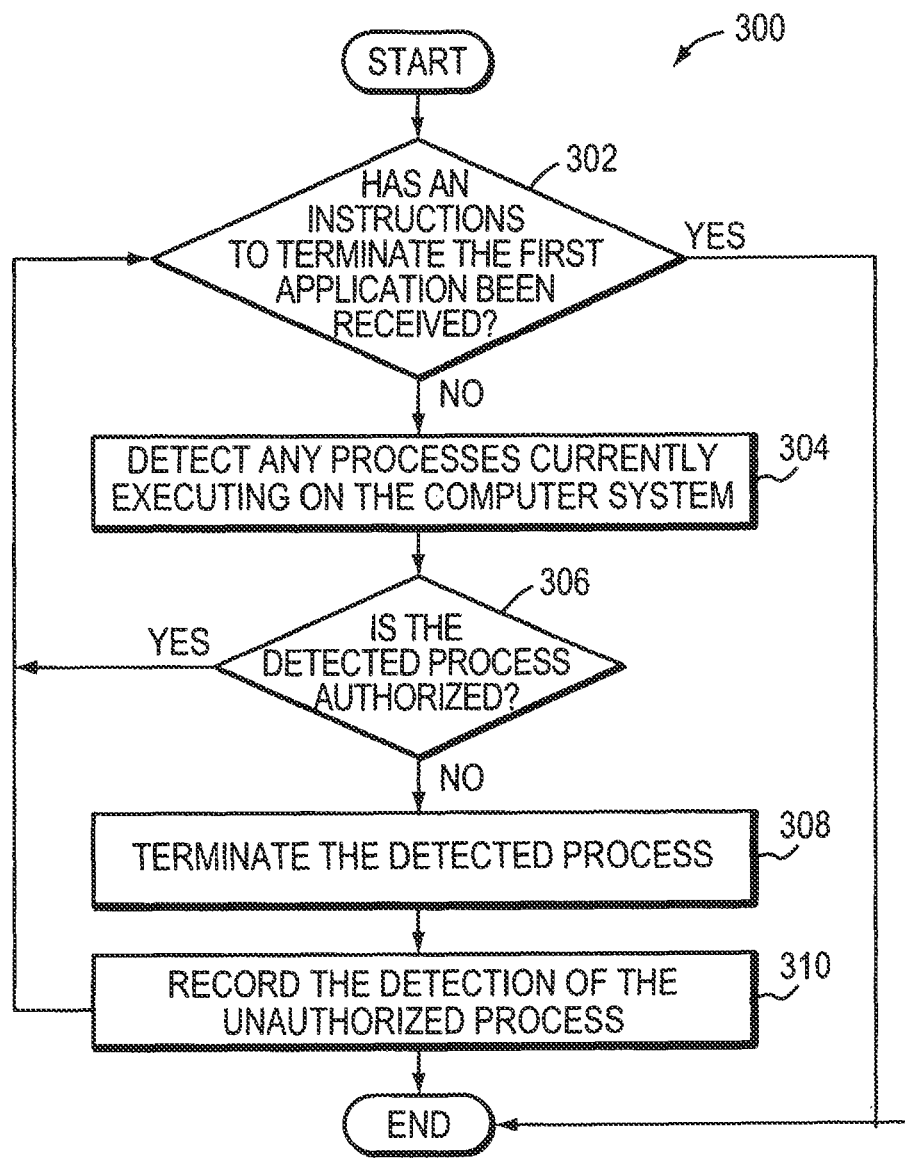
FIG. 10 is a flowchart illustrating an example embodiment of a method of terminating any unauthorized processes executing on a computer system during execution of an application.

Next, in Act 150, a background process (e.g., a daemon) may be initiated. This daemon may be configured to terminate any unauthorized processes executing on the computer system during execution of the first application FIG. 10 is a flowchart illustrating an example embodiment of a method 300 of terminating any unauthorized processes executing on a computer system during execution of an application.

In Act 302, it may be determined whether an instruction to terminate the application has been received, for example, in response to user input received through an interface, possibly in response to a prompt.

If it is determined in Act 302 that such an instruction has not been received, then, in a next Act 304, any processes currently executing on the computer system may be detected, for example, by accessing a registry that lists all processes currently executing on the computer system. Act 304 may include periodically accessing the registry on the computer system at predefined intervals, for example, every two seconds, and looping through each entry in the registry to ascertain the processes currently executing on the computer system.

For each process detected in Act 304, in Act 306 it may be determined whether the detected process is authorized.

A list of processes authorized to be executed on the computer system may be maintained, for example, as part of the method 100. Such a list may be maintained in any of a variety of ways, for example, by storing the list in one or more registers, by representing the list using one or more abstraction implemented using a programming language, or by storing the list in a file such as a text file.

The authorized process list may include at least the first application, and any authorized processes included in, or initiated by, the first application.

The authorized list also may include other processes. For example, method 100 may be implemented on a computer system owned or controlled by a controlling entity, for example, an employer, a parent, a professor, or anyone else who wishes to control access to content during execution of an application. Accordingly, each process on the authorized process list may be a process that allows access to content that the controlling entity deems appropriate or acceptable. For example, if the application is an application for a student to provide answers for examination (exam) questions, each process on the authorized process list may provide access to content related to the exam to which a professor deems appropriate for a student to have access. For example, for a statistics course, a professor may choose to allow a student to use a statistics package in preparing responses to exam questions. Accordingly, the professor may instruct a system administrator or programmer to add one or more processes corresponding to a statistics package application (including the administration package application itself) to the authorized process list.

For each process detected in Act 304, Act 306 may include accessing this authorized process list and comparing the detected process to each authorized process included in the list. Act 306 may include looping through the authorized process list until a match to the detected process is found or until the end of the authorized process list. Finding a match indicates that the process is authorized.

For each process detected in Act 304, in addition to looping through an authorized process list or as an alternative thereto, for each process detected in Act 304, Act 306 may include accessing a list of unauthorized processes and comparing the detected process to each unauthorized process included in the list. Act 306 may include looping through the unauthorized process list until a match to the detected process is found or until the end of the authorized process list. Finding a match indicates that the process is unauthorized.

If in Act 306 it is determined that the detected process is authorized, then method 300 may return to Act 304, for example, after the predefined interval for accessing the registry has lapsed.

If Act 306 includes both looping through an authorized process list and looping through an unauthorized process list, the unauthorized process list may function as an added security measure. The unauthorized process list may include one or more processes that a controlling entity is particularly concerned about executing during execution of the first application. For example, the unauthorized process list may include browser applications, (e.g., Microsoft Internet Explorer), applications for scheduling tasks to be performed on the to computer system, (e.g., Microsoft Task Scheduler), and applications for managing tasks performed on the computer system, (e.g., Microsoft Task Manager). Terminating task-managing manager and task-scheduling applications prevents a process (e.g., an application) that has been scheduled to execute during execution of the first application from executing.

Thus, during the first application, a previously scheduled process configured to access or display unauthorized content cannot be executed successfully. Because of the additional concern about processes that are listed on the unauthorized process list, as part of Act 306, the unauthorized process list may be accessed before the authorized process list.

If it is determined in Act 306 that the detected process is unauthorized, for example, if it is determined that the detected process does not match any of the processes of the authorized process list to which it was compared, then, in Act 308, the process may be terminated.

In a following Act 310, any detection of unauthorized processes being executed during execution of the application may be recorded, for example, by storing a record of the detection in a file (e.g., a text file) on the computer system.

Although, in method 300, Act 302 is illustrated as being performed serially with Acts 304-310, Act 302 may be performed in parallel to Acts 304-310. For example, Acts 304-310 may be performed as part of the background process (e.g., a daemon) initiated in Act 150 running in the background on the computer system as the first application is being executed. If Acts 304-310 are performed as part of such a background process, then the performance of Acts 304-310 may be a loop that will repeat until the background process is terminated.

Accordingly, if it is determined that an instruction to terminate the application has been received in Act 302, the background process may be terminated such that Acts 304-310 are no longer performed.

If for some reason Acts 302-308 do not prohibit a process from displaying some unauthorized content to a user of the computer system, method 300 may include capturing and storing the displayed content, for example, by recording in a file one or more screen shots of the viewed content as viewed by the user. Thus, a record of unauthorized content viewed by a user may be preserved. Such record may be used to verify the viewing of the content, for example, to evidence a student cheating on an exam.

Appendix 5 is a process, SSI_Daemon.cpp, written in the C++ programming language, that may be used as part of Act 300 to terminate any unauthorized processes that execute during execution of the first application. Other processes written in other programming languages or a combination of one or more programming languages, including the C++ programming language, may be used as part of Act 300 to terminate any unauthorized to processors that execute during execution of the first application.

Method 300 also may be configured to detect if there is more than one instance of the first application executing on the computer system, for example, by accessing a windows registry. Method 300 may be configured to terminate one of the plurality of instances of the first application, for example, the instance that initiated execution latest.

Returning to method 130 of FIG. 8, in a following Act 152, the first application may be further configured so that unauthorized content cannot be accessed by the first application.

For example, Act 152 may include loading the customized template described above in relation to Act 142, and launching one or more macros associated with the customized template, for example, MI initialize of the customized template Tempdoc.doc of Appendix IV.

Each of Acts 141, 142, 144, 150 and 152 may assist in prohibiting any unauthorized content from being accessed and/or viewed by a user of the computer system during execution of the first application. Other techniques may be used to prohibit unauthorized processes from being accessed or viewed by a user of the computer system during execution of the first application.

Next, in Act 154, the exam start time may be recorded on the computer system, for example, by storing the exam start time in a windows registry, as described above in relation to Act 142. Act 154 may be performed as part of executing a macro of the customized template, for example, the macro First Run of template Tempdoc.doc of Appendix IV.

In a following Act 156, the exam content may be copied into the created exam file. For example, if the exam is an exam in which the professor wishes to provide the questions or other content as part of the first application, then this content may be copied from a predetermined location into the exam file.

Alternatively, Act 156 may not be performed if the exam is an exam for which the professor did not provide any additional content. For example, if the exam is a blue book exam, and an exam file is a digital blue book.

In a next Act 158, the exam file may be opened by the first application so that the exam may begin. In other words, the student may be enabled to enter one or more responses to one or more questions of the examination.

In Act 159, the computer system may be configured such that, if the computer system is rebooted, execution of the student exam-management application is re-initiated. For example, as described above in relation to Act 102, a computer system parameter, for example, an auto run key may be set to a particular value so that if the system is rebooted, the exam-management application will be reinitiated. Further, as described above, another computer system parameter may be set such that only the user who last used the exam-management application may be allowed to log into a computer system login as part of the reboot procedure.

Next, in Act 160, the first application may be executed until an instruction is received to exit the first application. For example, a predetermined time limit may have expired such that the application is automatically exited, alternatively, a student may initiate exiting the first application, for example, by selecting a particular menu option or typing in a particular string of characters.

Act 160 may include periodically storing the exam file to a predefined location. This predefined location may be used for storing exam files during execution of the exam-taking application, whereas another predefined location may be used to store exam files upon the exam-taking application being exited, for example, after a user has completed an exam.

In addition to automatically saving the exam file to the predetermined directory periodically, the first application may be configured to enable a student to manually save the exam file during execution of the first application. For example, the first application may provide a pull-down menu including an option to save the exam file.

After the instructions to exit the first application are received, in Act 164, the exam-taking application exited may be exited.

Figure 12:
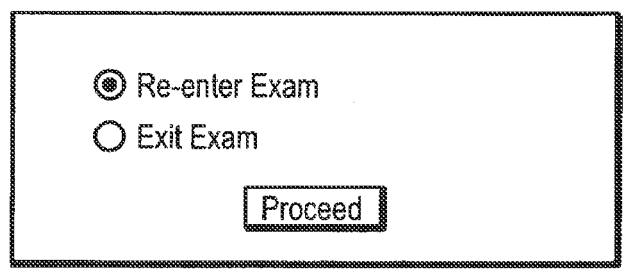
FIG. 12 is a screen shot illustrating an example of a graphical user interface enabling a user to re-enter or exit an exam-taking application.

If the user selects to exit the exam, the user may be presented with a GUI that provides a menu by which the user may select to either re-enter the exam or to officially exit the exam. For example, the user may be presented with the GUI of FIG. 12.

If the user selects to re-enter the exam, then control may be returned to the GUI of FIG. 11.

Alternatively, if the user selects to exit the exam, in Act 164, the first application may be exited.

Figure 13:
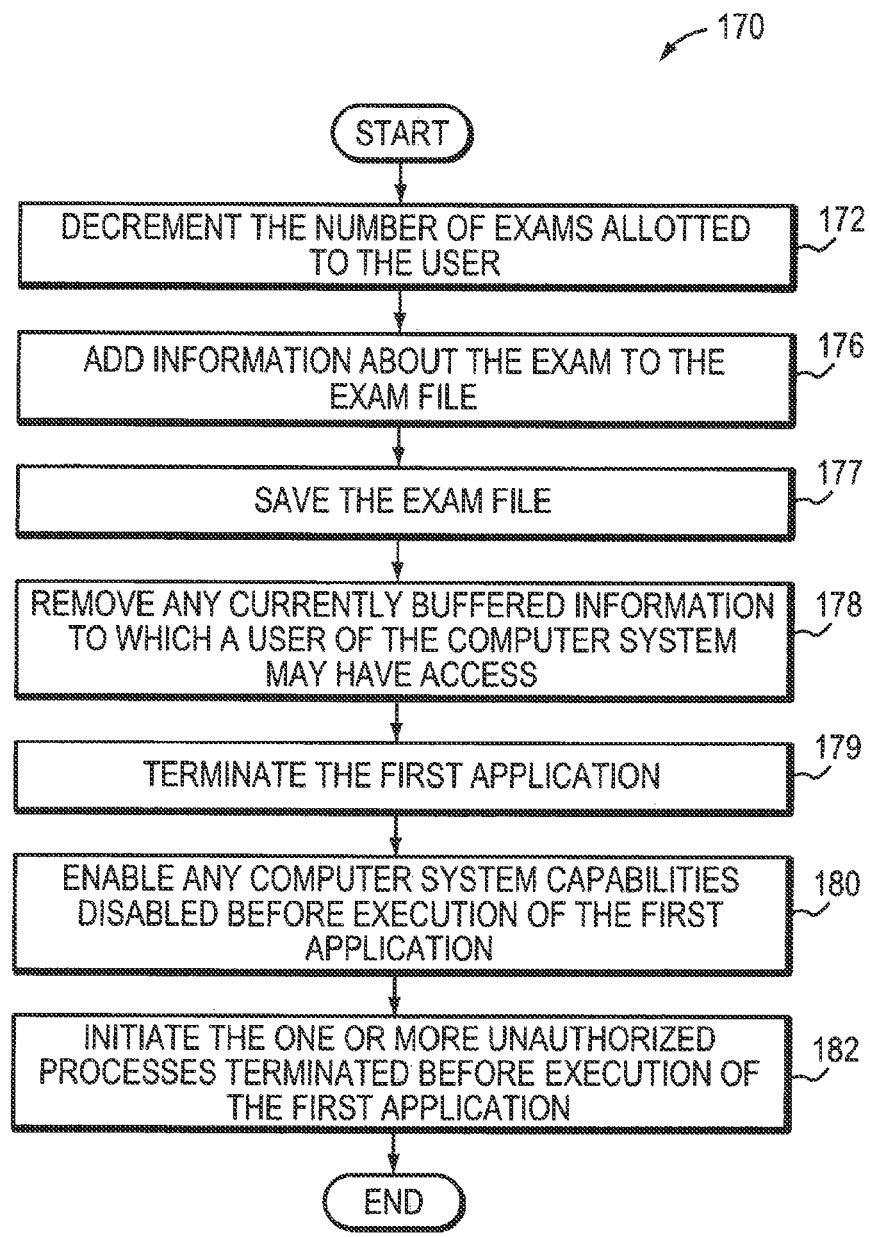
FIG. 13 is a flowchart illustrating an example of a method of exiting an exam-taking application.

FIG. 13 is a flowchart illustrating an example embodiment of a method 170 of exiting a first application.

In Act 172, a number of exams allotted to the user may be decremented. As described above, a user may be allotted a certain number of exams, for example, per semester. Accordingly, as a user exits an exam, this number of allotted exams may be decremented.

In a following Act 176, information about the exam may be added to the exam file. This information may be considered meta data about the exam. This information may include information described above in relation to Act 106 and the GUI of FIG. 2, and further may include information about the start and finish time of the exam for the student, including start and finish times that may have occurred as a result of the user rebooting the computer system or exiting the exam, but then deciding to return to the exam, as described in more detail below.

Further, the information added to the exam in Act 176 may include any detection of unauthorized processes recorded during execution of the first application, for example, as described above in relationship to Act 310. Accordingly, along with the user's responses to any of the questions of the exam, a record may be maintained of any unauthorized processes is terminated during the examination. The detection of these unauthorized processes may be indicative of an attempt by the student to cheat during the examination.

Figure 15:
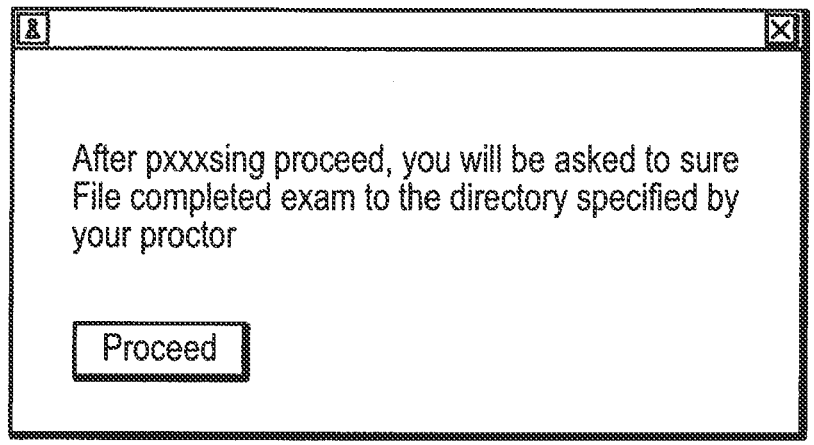
FIG. 15 is a screen shot illustrating an example of a graphical user interface that may be displayed to a user after exiting an exam-taking application.
Figure 16:
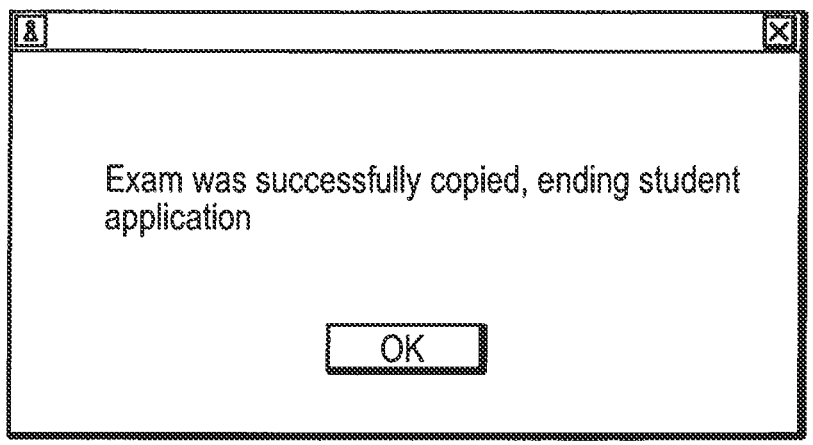
FIG. 16 is a screen shot illustrating an example of a graphical user interface that may be displayed to a user after exiting an saving the exam-taking application.

Next, in Act 178, the exam file may be saved, for example, to a predetermined location on the computer system. For example, Act 178 may include presenting to the user a GUI, for example, the GUI of FIG. 15, that informs the user that the user will be asked to save the completed exam to a predefined directory. Saving the exam file may include password protecting the exam file with a password corresponding to the customized template described above. The customized template may be configured with a macro that stores the password along with the exam file upon completion. Later, a grader of the exam may use the password to open the exam and grade it.

Act 178 may include storing the exam file to one or more predefined locations, for example, a directory on the computer system and/or to a floppy disk. Multiple copies may be saved such that one or more copies may serve as a backup in case a grader's copy is lost.

Act 178 also may include encrypting the stored exam file using one or more encryption keys. Accordingly, the exam file cannot be accessed without knowledge of the one or more encryption keys. It may be desirable to provide only the grader with the encryption key so that no other parties, including the student who took the exam, can access the exam file. Encrypting the exam file prevents another party from viewing a user's responses to exam questions, changing a user's responses to questions, or other forms of tampering.

The exam file may be encrypted using any of a variety of forms of encryption, for example, the encryption function described above in relation to Act 210 with respect to programming hooks.

In a following Act 178, any currently buffered information to which a user of the computer system may have access may be removed. For example, any text left on a clipboard by a user of the exam-taking application may be removed so that no other parties have access to the student's responses to exam questions. Further, removing any buffered information in Act 178 prevent the student from copying the information in the buffer to another location.

In a next Act 179, the first application may be terminated.

In a following Act 180, capabilities of the computer system disabled before execution of the first application may be enabled, for example, as described below in relation to FIG. 14.

In a following Act 182, the one or more unauthorized processes terminated before execution of the first application may be initiated. For example, the list of terminated processes described above in relation to Act 208 may be accessed and each process in the list may be initiated. Thus, if a user had several applications, for example, an email application and a browser application executing before execution of the exam-taking application began, these applications will be initiated so that the user's computer system is returned to the state that it was in before the user executed the exam-taking application.

Figure 14:
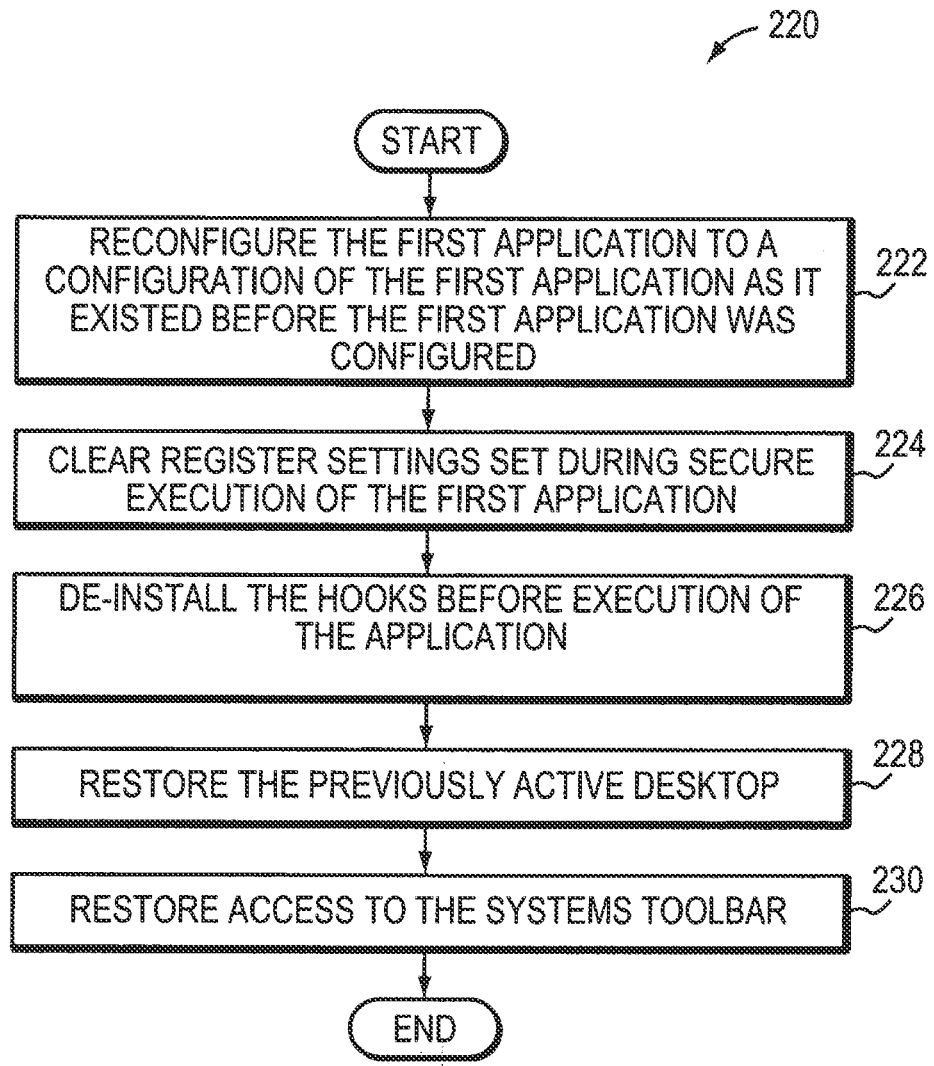
FIG. 14 is a flowchart illustrating an example of a method of enabling any computer system functions disabled before execution of an exam-taking application.

FIG. 14 is a flowchart illustrating an example of method 220 for exiting a securely executing application such as the exam-taking application.

In Act 222, the first application may be reconfigured to a configuration of the first application as it existed before the first application was configured as described above in relation to Acts 142 and 152. For example, if the first application is Microsoft Word, Act 222 may include reconfiguring Word so that the typical menu options, hot keys, hyperlinking, and other functionality is available as it was before Acts 142 and 152 were performed. Further, Act 222 may include replacing the customized normal.dot template, customized as described above in relation to Act 142, with the original normal.dot template.

Next, in Acts 224, any register settings set during the execution of method 100, for example, by Act 159, may be cleared. Thus, the system parameter set such that the student exam-management application would be initiated upon rebooting of the system may be reset such that such initiation will not occur a next time the system is rebooted. Further, the system parameter set such that only the last user who logged into the student exam-management application can log on to the computer system may be reset such that any user with a valid password can logon to the computer system.

Next, in Acts 226, any of the books installed when disabling functionality of the computer system as described above in relation to Acts 210 of FIG. 9, may be de-installed.

In a following Acts 228, the previously active desktop, disabled as described above in relation to Acts 204, may be re-installed from the backup copy created as part of Act 204.

Next, in Act 230, access may be restored to the system toolbar for which access was disabled as described above in relation to Act 206. Accordingly, user access to backup processes may be restored.

Returning to method 140 of FIG. 8, in Act 166, the background process for terminating unauthorized processes is itself terminated. By terminating the background process, this prevents the background process for continuing to terminate unauthorized processes during the user's use of the computer system after the exam-taking application has been exited.

A user may reboot the computer system during execution of the exam-taking application either inadvertently or intentionally to attempt to circumvent the acts described above for prohibiting access to unauthorized content. Further, the system may reboot for other reasons unrelated to actions of the user.

Returning to method 100 of FIG. 1, in Act 102, if it is determined that the execution of the exam-management application is the result of the computer system being rebooted during execution of an exam-taking application, the execution of the exam-taking application may be restored in Act 104.

As described above, while a user is taking an application using the exam-taking application, the exam file is periodically stored at a predetermined location for storing exam files for exams in progress. Accordingly, Act 104 may include retrieving the exam file from this predetermined location. Next, restoring execution of the exam-taking application may include performing Acts 141-146, 150-154 and Acts 158-164 of method 130, as described in more detail below. Thus, if a user intentionally reboots the computer system in an effort to circumvent such acts and access unauthorized content, such acts are performed again to prevent this circumvention.

Act 104 of restoring execution of the exam-taking application may not include Act 148 of creating the exam file because the exam file was already created before the computer system was rebooted, and may not include performing Act 156 of copying exam content to the created exam file because the content (if any) was already copied as part of method 130 before the computer system was rebooted.

The order of the acts performed as part of methods 140, 170 and 220 is not limited to the order illustrated in FIGS. 8, 13 and 14, as the acts may be performed in other orders. Further, one or more of the acts of methods 140, 170 and 220 may be performed in series or in parallel to one or more other acts.

Methods 140, 170 and 220 are merely illustrative embodiments of method performed as part of securely executing an application, such that an authorized content may not be accessed or viewed by a user of a computer system. Such an illustrative embodiments are not meant to limit the scope of any of the claims set forth below and are provided merely for illustrative purposes, as any of a variety of other methods may be performed as part of securely executing an application, such that an authorized content may not be accessed or viewed by a user of a computer system, for example, variations of such methods, may fall within the scope of one or more of the claims set froth below.

Accordingly, if a user selects the menu option to take an exam, a GUI may be displayed to inform the user that upon the exam-taking application being initiated, the user will have used one of the exams allotted to the user. The GUI may present to the user an option of proceeding to take the exam and using one of the allotted exams, or to not take the exam, and thus not exhaust one of the allotted exams.

If the user elects to proceed, for example, by selecting an appropriate button on the GUI, but the user has no more remaining allotted exams, the GUI may provide a message informing the user that no remaining exams are allotted to the user. The message also may indicate that the user must contact an administrator or access a predetermined network resource in order to request allotment of more exams.

Next, if the user has not exhausted her allotted exams, the user may be prompted for more information about the exam to be taken, from which the application to be executed may be determined.

Next, the first application may be executed, which may include providing the user with a GUI into which the user can enter text.

For example, the exam may be an exam that requires written answers, and the executed application may be Microsoft Word. Accordingly, the GUI may be a customized GUI of Microsoft Word as illustrated in FIG. 1.

Figure 17:
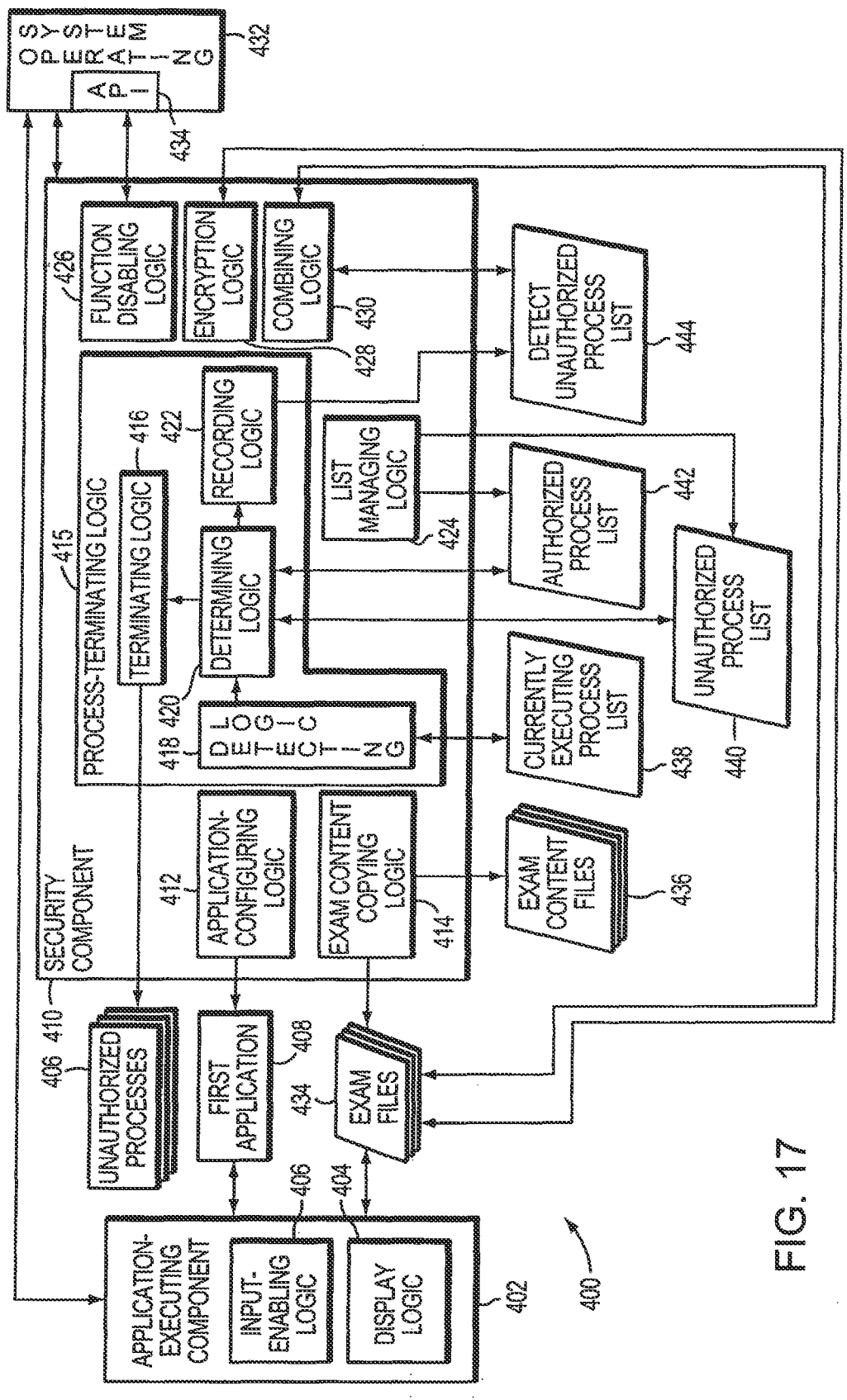
FIG. 17 is a block diagram illustrating an example of a system for securely executing an exam-taking application.

FIG. 17 is a block diagram illustrating an example of a system 400 for securely executing an application on a computer system. The system 400 may include an application-executing component 402 and a security component 414, where the application-executing component and the security component 410 may communicate with the operating system 432, which may include an API 434.

The application-executing component 402 may include, inter alia, display logic 404 for displaying content to a user of the computer system and input-enabling logic 406 for enabling a user to provide input to the computer system.

The application-executing component may be configured to execute a first application 408 and to access and manipulate one or more exam files 434 as part of the first application 408, for example, as described above in relation to Act 160.

The security component 410 may include, inter alia, application-configuring logic 412, exam content copying logic 414, process-terminating logic 415, function-disabling logic 426, encryption logic 428 and combining logic 430.

The application-configuration logic 412 may be configured to configure a first application 408 so that unauthorized content cannot be accessed by the first application 408, for example, as described above in relation to Acts 142 and 152 of method 140.

The exam content copying logic 414 may be configured to copy exam content from one or more exam content files 436 to one or more exam files 434, for example, as described above in relation to act 156 of FIG. 8.

The process-terminating logic 414 may include terminating logic 416, detection logic 418, determining logic 420 and recording logic 422.

The process-terminating logic 414 may be configured to terminate any unauthorized processes executing on the computer system before execution of the first application 408 and during execution of the first application 408, for example, as described above in relation to Acts 144, 208, and 150 and method 300.

Detection logic 418 may be configured to detect any processes currently executing on the computer system, for example, as described above in relation to Act 304 of method 300. The detection logic 418 may be configured to access a currently executing process list 438, for example, a Windows registry, as described above in relation to Act 304.

The determining logic 420 may be configured to determine if a process detected by detection logic 418 is authorized, for example, as described above in relation to Act 306 of method 300. The determining logic 420 may be configured to access an unauthorized process list 440 and/or an authorized process list 442, for example, as described above in relation to Act 306.

The terminating logic 416 may be configured to terminate a process detected by detecting logic 418 and determined to be unauthorized by determining logic 420, for example, as described above in relation to Act 308 of method 300.

Recording logic 422 may be configured to record the detection of any processes determined to be unauthorized by determining logic 420, for example, as described above in relation to Act 310 of method 300. The recording logic 422 may be configured to record such detections to a detected unauthorized process list 444, which may be implemented as a text file, as described above in relation to Act 310.

Function-disabling logic 426 may be configured to disable any capabilities provided by the computer system by which a user of the computer system may access or view unauthorized content, for example, as described above in relation to Act 141 of method 140 and in relation to method 200. The function-disabling logic 426 may be configured to use the API 434 to disable capabilities provided by the operating system 432, for example, as described above in relation to Act 210 of method 200.

Combining logic 430 may be configured to combine an exam file 434 with the detected unauthorized process list 444, for example, as described above in relation to Act 178 of method 170.

Encryption logic 428 may be configured to encrypt one or more exam files 434, for example, as described above in relation to Act 178 of method 170.

To create an exam and to access and grade completed exams, a grader exam-management application may be provided. The grader exam-management application may include a first module for creating an exam and a second module for accessing and grading completed exams.

The exam creation module may enable users (e.g., instructions or professors) to create an exam and an encrypt the exam for later use by an exam-taking application. The exam creation module may provide users one or more options for the format of an exam. The exam creation module may provide a first option of creating an exam that does not include any exam content (i.e., questions), which may be considered a "bluebook" type of exam. The exam creation module also may provide the option of creating an exam that includes exam content (i.e., questions). Before running the exam creation module, a user (e.g., a professor, instructor or teaching assistant) may create an exam content file by using a word processing application such as Microsoft Word. The exam creation module then may be used to provide a password for and/or encrypt the exam content file.

In a first act, the user may be prompted to enter the user's ID and password.

In a next act, the exam creation module may enable the user to locate the exam content file, for example, by enabling use of a browser application.

In a next act, the user may be prompted to enter a password that any students who will take the exam will be required to enter in order to take the exam and access the exam content file. The password and exam content then may be saved together in the exam content file.

The grader module of the grader exam-management application may be configured to access and decrypt exam files that contain an exam completed by a student so that a grader (e.g., professor or teaching assistant) may grade the exams.

The grading module may include an act of providing a GUI through which a grader may login. If the grader enters a valid grader ID and password, the grader module next may provide a GUI to enable the grader to select a location from which to select an exam file.

Upon receiving the selection of the location, for example, a directory, the grader module may provide a list of exam files that the grader may access, decrypt and grade.

In response to the grader selecting one or more exam files, and selecting a "decrypt" button, the one or more selected exam files may be decrypted. To prevent a grader from overwriting an already decrypted and graded exam, if an exam has already been decrypted and graded, the encrypted version of the exam file may not be displayed by the grader module, although the encrypted version may still be stored at the selected location (e.g., directory).

After the exam has been decrypted, the first application by which the exam was taken may be initiated so that the grader may review and grade the student's responses to the examination questions. For example, the first application may be a word-processing application such as Microsoft Word, and the grader module may initiate Microsoft Word and open the decrypted exam file.

Methods 100, 140, 200, 300, 170 and 220, described above in relation to FIGS. 1, 8, 9, 10, 13 and 14, acts thereof, respectively, and various embodiments and variations of these methods and acts, individually or in combination may be implemented as a computer program product tangibly embodied as computer-readable signals on a computer-readable medium, for example, a non-volatile recording medium, an integrated circuit memory element, or a combination thereof. Such a computer program product may comprise computer-readable signals tangibly embodied on the computer-readable medium, where such signals define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, or C++, or any of a variety of combinations thereof.

The methods, acts, systems, and system elements described above in relation to FIGS. 1-17 may be implemented using a computer system, such as the various embodiments of computer systems described below, although the methods, acts, systems, and system elements described above are not limited in their implementation to any specific computer system described herein, as many other different machines may be used.

Such a computer system may include several known components and circuitry, including a processing unit (i.e., processor), a memory system, input and output devices and interfaces, transport circuitry (e.g., one or more busses), a video and audio data input/output (I/O) subsystem, special-purpose hardware, as well as other components and circuitry, as described below in more detail. Further, the computer system may be a multi-processor computer system or may include multiple computers connected over a computer network.

The computer system may include a processor, for example, a commercially available processor such as one of the series x86, Celeron and Pentium processors, available from Intel, similar devices from AMD and Cyrix, the 680X0 series microprocessors available from to Motorola, and the PowerPC microprocessor from IBM. Many other processors are available. The computer system is not limited to a particular processor.

A processor typically executes a program called an operating system, of which Windows NT, Windows 2000, Windows ME, Windows 95 or Windows 98, UNIX Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system together define a computer platform for which application programs in high-level programming languages are written. The computer system is not limited to a particular computer platform.

The computer system may include a memory system, which typically includes a computer readable and writeable non-volatile recording medium, of which a magnetic disk, optical disk, a flash memory and tape are examples. Such a recording medium may be removable such as, for example, a floppy disk, read/write CD or memory stick, or permanent, for example, a hard drive. Such a recording medium stores signals, typically in binary form (i.e., a form interpreted as a sequence of one and zeros). A disk (magnetic or optical) has a number of tracks on which such signals may be stored. Such signals may define a program, e.g., an application program, to be executed by the microprocessor, or information to be processed by the application program.

The memory system of the computer system also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium, e.g., disk.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer system that implements the methods, acts, systems and system elements described above in relation to FIGS. 1-17 is not limited thereto. The computer system is not limited to a particular memory system.

At least part of such a memory system described above may be used to store one or more of the data structures described above in relation to FIGS. 1-17. For example, at least part of the non-volatile recording medium may store at least part of a database that includes one or more of such data structures. Such a database may be any of a variety of types of databases, for example, a flat-file database where data is organized into data units separated by delimiters, a relational database where data is organized into data units stored in tables, an object-oriented database where data is organized into data units stored as objects, or another is type of databases.

The computer system may include a video and audio data I/O subsystem. An audio portion of the subsystem may include an analog-to-digital (A/D) converter, which receives analog audio information and converts it to digital information. The digital information may be compressed using known compression systems for storage on the hard disk to use at another time. A typical video portion of the I/O subsystem may include a video image compressor/decompressor of which many are known in the art. Such compressor/decompressors convert analog video information into compressed digital information, and vice-versa. The compressed digital information may be stored on hard disk for use at a later time.

The computer system may include one or more output devices. Example output devices include a cathode ray tube (CRT) display, liquid crystal displays (LCD) and other video output devices, printers, communication devices such as a modem or network interface, storage devices such as disk or tape, and audio output devices such as a speaker.

The computer system also may include one or more input devices. Example input devices include a keyboard, keypad, track ball, mouse, pen and tablet, communication devices such as described above, and data input devices such as audio and video capture devices and sensors. The computer system is not limited to the particular input or output devices described herein.

The computer system may include specially programmed, special purpose hardware, for example, an application-specific integrated circuit (ASIC). Such special-purpose hardware may be configured to implement one or more of the methods, acts and systems described above in relation to FIGS. 1-17.

The computer system and components thereof may be programmable using any of a variety of one or more suitable computer programming languages. Such languages may include procedural programming languages, for example, C, Pascal, Fortran and BASIC, object-oriented languages, for example, C++, Java and Eiffel and other languages, such as Visual Basic, a scripting language or even assembly language.

The methods, acts and systems described above in relation to FIGS. 1-17 may be implemented using any of a variety of suitable programming languages, including procedural programming languages, object-oriented programming languages, other languages and combinations thereof which may be executed by such a computer system. Such methods and acts may be implemented as separate modules of a computer program, or may be implemented individually as separate computer programs. Such modules and programs may be executed on separate computers.

The methods, acts, systems, and system elements described above in relation to FIGS. 1-17 may be implemented in software, hardware or firmware, or any combination of the three, as part of the computer system described above or as an independent component.

Such methods, acts, systems and system elements, either individually or in combination, may be implemented as a computer program product tangibly embodied as computer-readable signals on a computer-readable medium, for example, a non-volatile recording medium, an integrated circuit memory element, or a combination thereof. For each such method and act, such a computer program product may comprise computer-readable signals tangibly embodied on the computer-readable that define instructions, for example, as part of one or more programs, that, as a result of being executed by a computer, instruct the computer to perform the method or act.

Having now described some illustrative embodiments of the invention claimed below, it should be apparent to those skilled in the art that the foregoing is merely illustrative and not limiting, having been presented by way of example only. Numerous modification and other illustrative embodiments are within the scope of one of ordinary skill in the art and are contemplated as falling within the scope of the claims set forth below. In particular, although many of the examples presented herein involve specific combinations of method acts or system elements, it should be understood that those acts and those elements may be combined in other ways to accomplish the same objectives. Acts, elements and features discussed only in connection with one embodiment of a system or method are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

What is claimed is:

1. A method for securely administering a computer-based examination, the method comprising:
   providing a set of authorized application processes, the set of authorized application processes comprising processes other than essential operating system processes that are permitted to execute on a computer;
   monitoring commands being provided to the computer during the provision of an electronic examination, the commands instructing the computer to execute one or more requested processes;
   determining if one or more of the requested processes are in the set of authorized application processes to be executed during provisioning of the examination;
   prohibiting the execution of any requested processes that are not in the set of authorized processes while allowing the provisioning of the examination to continue; and
   transmitting an alert that an attempt was made to execute a prohibited process.

2. A system for securely administering a computer-based examination, the system comprising;
   a data storage module for storing a set of authorized application processes, the authorized processes comprising processes other than essential operating system processes that are permitted to execute on a computer; and
   a security module for:
      monitoring, during the administration of the examination, commands being provided to the computer, the commands instructing the computer to execute one or more requested processes for execution on the computer;
      determining if one or more of the requested processes are in the set of authorized application processes to be executed during provisioning of the examination;
      blocking the execution of those requested processes that are not in the set of authorized processes while allowing the provisioning of the examination to continue; and
      transmitting an alert that an attempt was made to execute a prohibited process.

* * * * *